US012701450B2

(12) United States Patent
Metwaly Saad et al.

(10) Patent No.: US 12,701,450 B2
(45) Date of Patent: Aug. 4, 2026

(54) TECHNIQUES FOR ENHANCED MEASUREMENT GAPS USING SENSING PROCEDURES

(71) Applicant: QUALCOMM Incorporated, San Diego, CA (US)

(72) Inventors: Hussein Metwaly Saad, San Diego, CA (US); Diana Maamari, San Diego, CA (US); Peerapol Tinnakornsrisuphap, San Diego, CA (US); Mickael Mondet, Louannec (FR); Hyun Yong Lee, San Diego, CA (US); Ravi Agarwal, San Diego, CA (US); Simone Merlin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 401 days.

(21) Appl. No.: 18/457,763

(22) Filed: Aug. 29, 2023

(65) Prior Publication Data

US 2025/0081014 A1 Mar. 6, 2025

(51) Int. Cl.
*H04W 24/10* (2009.01)
*H04W 8/22* (2009.01)

(52) U.S. Cl.
CPC ............. *H04W 24/10* (2013.01); *H04W 8/22* (2013.01)

(58) Field of Classification Search
CPC ................................. H04W 24/10; H04W 8/22
See application file for complete search history.

(56) References Cited

U.S. PATENT DOCUMENTS

2023/0025432 A1* 1/2023 Da Silva ............. H04W 64/006
2024/0040461 A1* 2/2024 Da Silva ............... H04W 36/30

FOREIGN PATENT DOCUMENTS

WO WO-2022005353 A1 1/2022
WO WO-2022153636 A1 * 7/2022 ............ H04W 24/10

OTHER PUBLICATIONS

International Search Report and Written Opinion—PCT/US2024/036150—ISA/EPO—Oct. 15, 2024.

* cited by examiner

*Primary Examiner* — Joseph A Bednash
(74) *Attorney, Agent, or Firm* — Holland & Hart LLP

(57) ABSTRACT

Methods, systems, and devices for wireless communications are described. A user equipment (UE) may receive control signaling from a serving network entity instructing the UE to predict a signal quality measurement of a neighbor network entity using perception information sensed by the UE. The UE may then transmit a measurement report to the serving network entity indicating a signal quality measurement prediction for the neighbor network entity based on the control signaling and the perception information sensed by the UE.

24 Claims, 17 Drawing Sheets

910

920

915

905

900

130

105

115

Network
Entity

Transceiver

1210

Antenna

1215

Communications
Manager

1220

Memory

Code

1230

1225

1240

Processor

1235

1205

1200

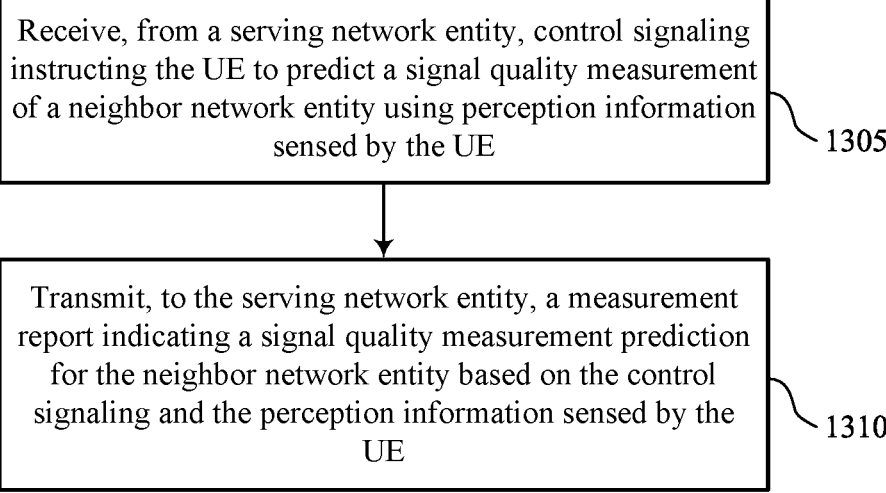

Receive, from a serving network entity, control signaling instructing the UE to predict a signal quality measurement of a neighbor network entity using perception information sensed by the UE

1305

Transmit, to the serving network entity, a measurement report indicating a signal quality measurement prediction for the neighbor network entity based on the control signaling and the perception information sensed by the UE

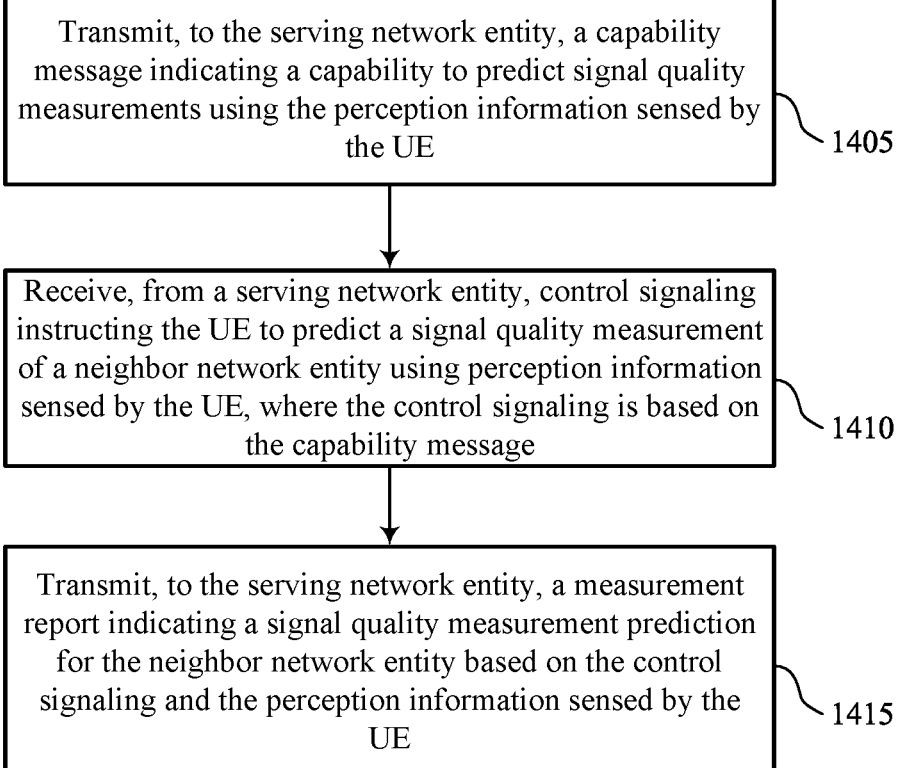

Transmit, to the serving network entity, a capability message indicating a capability to predict signal quality measurements using the perception information sensed by the UE

1405

Receive, from a serving network entity, control signaling instructing the UE to predict a signal quality measurement of a neighbor network entity using perception information sensed by the UE, where the control signaling is based on the capability message

1410

Transmit, to the serving network entity, a measurement report indicating a signal quality measurement prediction for the neighbor network entity based on the control signaling and the perception information sensed by the UE

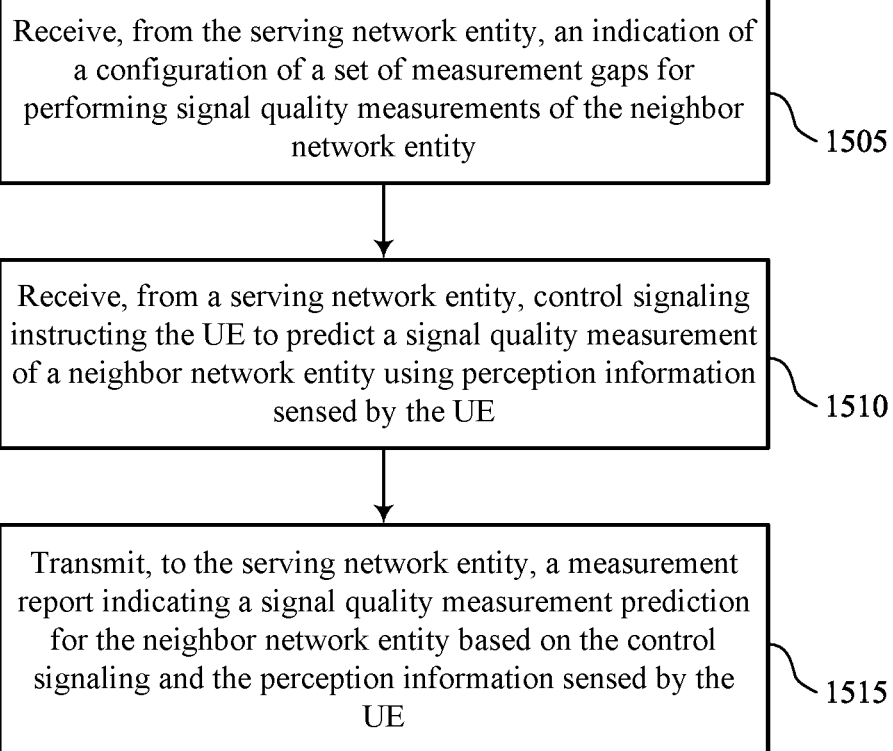

Receive, from the serving network entity, an indication of a configuration of a set of measurement gaps for performing signal quality measurements of the neighbor network entity

1505

Receive, from a serving network entity, control signaling instructing the UE to predict a signal quality measurement of a neighbor network entity using perception information sensed by the UE

1510

Transmit, to the serving network entity, a measurement report indicating a signal quality measurement prediction for the neighbor network entity based on the control signaling and the perception information sensed by the UE

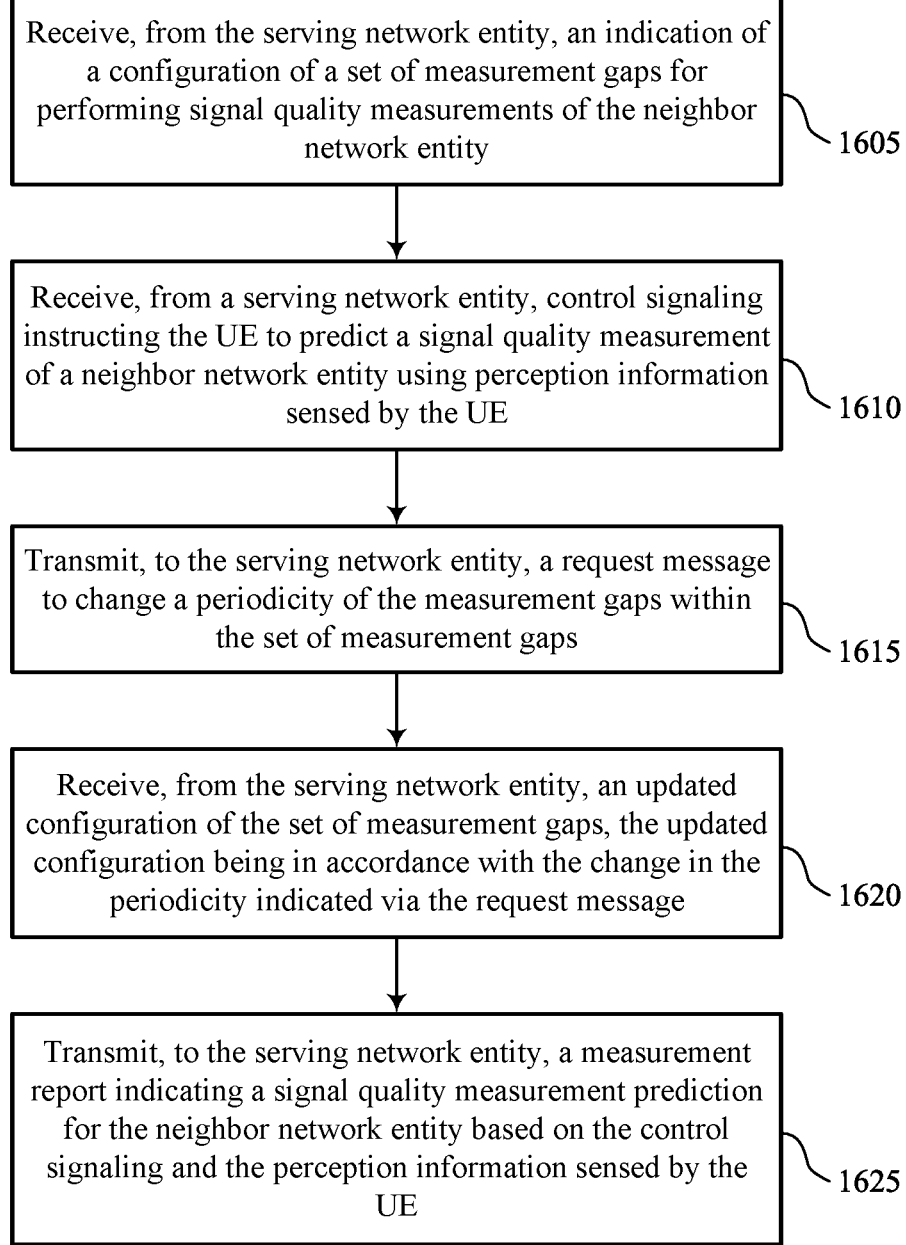

Receive, from the serving network entity, an indication of a configuration of a set of measurement gaps for performing signal quality measurements of the neighbor network entity

1605

Receive, from a serving network entity, control signaling instructing the UE to predict a signal quality measurement of a neighbor network entity using perception information sensed by the UE

1610

Transmit, to the serving network entity, a request message to change a periodicity of the measurement gaps within the set of measurement gaps

1615

Receive, from the serving network entity, an updated configuration of the set of measurement gaps, the updated configuration being in accordance with the change in the periodicity indicated via the request message

1620

Transmit, to the serving network entity, a measurement report indicating a signal quality measurement prediction for the neighbor network entity based on the control signaling and the perception information sensed by the UE

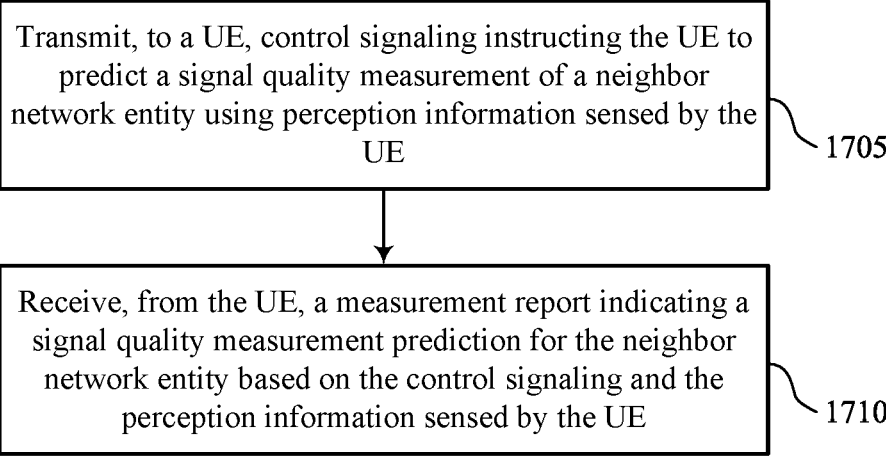

Transmit, to a UE, control signaling instructing the UE to predict a signal quality measurement of a neighbor network entity using perception information sensed by the UE      ⟋ 1705

Receive, from the UE, a measurement report indicating a signal quality measurement prediction for the neighbor network entity based on the control signaling and the perception information sensed by the UE      ⟋ 1710

TECHNIQUES FOR ENHANCED MEASUREMENT GAPS USING SENSING PROCEDURES

FIELD OF TECHNOLOGY

The following relates to wireless communications, including techniques for enhanced measurement gaps using sensing procedures.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless communication systems may support extended reality (XR) wireless devices (e.g., UEs, network entities), which may include virtual reality (VR), augmented reality (AR), mixed reality (MR), or a combination thereof. Further, an XR wireless device may include a variety of sensors (e.g., cameras, IMU sensors) that the XR wireless devices may utilize to build a perception (e.g., awareness) of an environment surrounding the XR wireless devices.

SUMMARY

The described techniques relate to improved methods, systems, devices, and apparatuses that support techniques for enhanced measurement gaps using sensing procedures. For example, the described techniques provide for a user equipment (UE) to receive control signaling from a serving network entity instructing the UE to predict a signal quality measurement of a neighbor network entity using perception information sensed by the UE. The UE may then transmit a measurement report to the serving network entity indicating a signal quality measurement prediction for the neighbor network entity based on the control signaling and the perception information sensed by the UE.

A method for wireless communications by a UE is described. The method may include receiving, from a serving network entity, control signaling instructing the UE to predict a signal quality measurement of a neighbor network entity using perception information sensed by the UE and transmitting, to the serving network entity, a measurement report indicating a signal quality measurement prediction for the neighbor network entity based on the control signaling and the perception information sensed by the UE.

A UE for wireless communications is described. The UE may include one or more memories storing processor executable code, and one or more processors coupled with the one or more memories. The one or more processors may individually or collectively operable to execute the code to cause the UE to receive, from a serving network entity, control signaling instructing the UE to predict a signal quality measurement of a neighbor network entity using perception information sensed by the UE and transmit, to the serving network entity, a measurement report indicating a signal quality measurement prediction for the neighbor network entity based on the control signaling and the perception information sensed by the UE.

Another UE for wireless communications is described. The UE may include means for receiving, from a serving network entity, control signaling instructing the UE to predict a signal quality measurement of a neighbor network entity using perception information sensed by the UE and means for transmitting, to the serving network entity, a measurement report indicating a signal quality measurement prediction for the neighbor network entity based on the control signaling and the perception information sensed by the UE.

A non-transitory computer-readable medium storing code for wireless communications is described. The code may include instructions executable by a processor to receive, from a serving network entity, control signaling instructing the UE to predict a signal quality measurement of a neighbor network entity using perception information sensed by the UE and transmit, to the serving network entity, a measurement report indicating a signal quality measurement prediction for the neighbor network entity based on the control signaling and the perception information sensed by the UE.

Some examples of the method, UEs, and non-transitory computer-readable medium described herein may further include operations, features, means, or instructions for transmitting, to the serving network entity, a capability message indicating a capability to predict signal quality measurements using the perception information sensed by the UE, where the control signaling may be based on the capability message.

Some examples of the method, UEs, and non-transitory computer-readable medium described herein may further include operations, features, means, or instructions for receiving, from the serving network entity, an indication of a configuration of a set of measurement gaps for performing signal quality measurements of the neighbor network entity, where the control signaling instructs the UE to predict the signal quality measurement of the neighbor network entity using the perception information to instead of performing a measurement of the neighbor network entity during a measurement gap of the set of measurement gaps.

Some examples of the method, UEs, and non-transitory computer-readable medium described herein may further include operations, features, means, or instructions for transmitting, to the serving network entity, the measurement report indicating the signal quality measurement prediction based on an overlap of a first resource allocated for transmission of a data message and a second resource allocated for the measurement gap and transmitting the data message via the first resource.

Some examples of the method, UEs, and non-transitory computer-readable medium described herein may further include operations, features, means, or instructions for transmitting, to the serving network entity, a report indicating that the UE may be skipping performing a measurement during a measurement gap based on an overlap of a first resource allocated for reception of a data message and a second resource allocated for the measurement gap, where the control signaling instructing the UE to predict the signal quality measurement of the neighbor network entity using the perception information sensed by the UE may be based on the report and receiving the data message via the first resource.

Some examples of the method, UEs, and non-transitory computer-readable medium described herein may further include operations, features, means, or instructions for receiving, from the serving network entity, an indication of a configuration of a set of measurement gaps for performing signal quality measurements of the neighbor network entity.

Some examples of the method, UEs, and non-transitory computer-readable medium described herein may further include operations, features, means, or instructions for transmitting, to the serving network entity, a request message to change a periodicity of the measurement gaps within the set of measurement gaps and receiving, from the serving network entity, an updated configuration of the set of measurement gaps, the updated configuration being in accordance with the change in the periodicity indicated via the request message.

Some examples of the method, UEs, and non-transitory computer-readable medium described herein may further include operations, features, means, or instructions for receiving, from the serving network entity, a control message indicating a signal quality threshold, where the request message to change the periodicity of the measurement gaps within the set of measurement gaps may be based on a signal quality measurement of the neighbor network entity satisfying the signal quality threshold.

In some examples of the method, UEs, and non-transitory computer-readable medium described herein, transmitting the request message may include operations, features, means, or instructions for receiving, from the serving network entity, a control message indicating a signal quality threshold, where the request message to change the periodicity of the measurement gaps within the set of measurement gaps may be based on the signal quality measurement prediction for the neighbor network entity failing to satisfy the signal quality threshold.

In some examples of the method, UEs, and non-transitory computer-readable medium described herein, the UE to refrains from performing a measurement during at least one measurement gap of the set of measurement gaps based on the control signaling.

In some examples of the method, UEs, and non-transitory computer-readable medium described herein, the signal quality measurement prediction may be based on a spatial map of an environment.

Some examples of the method, UEs, and non-transitory computer-readable medium described herein may further include operations, features, means, or instructions for generating the spatial map of the environment by performing signal quality measurements during a set of signal quality measurements and transmitting, to the serving network entity, a message indicating that the spatial map of the environment may be generated, where receiving the control signaling may be based on the message.

In some examples of the method, UEs, and non-transitory computer-readable medium described herein, the spatial map of the environment may be generated using a ML model.

A method for wireless communications by a network entity is described. The method may include transmitting, to a UE, control signaling instructing the UE to predict a signal quality measurement of a neighbor network entity using perception information sensed by the UE and receiving, from the UE, a measurement report indicating a signal quality measurement prediction for the neighbor network entity based on the control signaling and the perception information sensed by the UE.

A network entity for wireless communications is described. The network entity may include one or more memories storing processor executable code, and one or more processors coupled with the one or more memories. The one or more processors may individually or collectively operable to execute the code to cause the network entity to transmit, to a UE, control signaling instructing the UE to predict a signal quality measurement of a neighbor network entity using perception information sensed by the UE and receive, from the UE, a measurement report indicating a signal quality measurement prediction for the neighbor network entity based on the control signaling and the perception information sensed by the UE.

Another network entity for wireless communications is described. The network entity may include means for transmitting, to a UE, control signaling instructing the UE to predict a signal quality measurement of a neighbor network entity using perception information sensed by the UE and means for receiving, from the UE, a measurement report indicating a signal quality measurement prediction for the neighbor network entity based on the control signaling and the perception information sensed by the UE.

A non-transitory computer-readable medium storing code for wireless communications is described. The code may include instructions executable by a processor to transmit, to a UE, control signaling instructing the UE to predict a signal quality measurement of a neighbor network entity using perception information sensed by the UE and receive, from the UE, a measurement report indicating a signal quality measurement prediction for the neighbor network entity based on the control signaling and the perception information sensed by the UE.

Some examples of the method, network entities, and non-transitory computer-readable medium described herein may further include operations, features, means, or instructions for receiving, from the UE, a capability message indicating a capability to predict signal quality measurements using the perception information sensed by the UE, where the control signaling may be based on the capability message.

Some examples of the method, network entities, and non-transitory computer-readable medium described herein may further include operations, features, means, or instructions for transmitting, to the UE, an indication of a configuration of a set of measurement gaps for the UE to perform signal quality measurements of the neighbor network entity, where the control signaling instructs the UE to predict the signal quality measurement of the neighbor network entity using the perception information instead of performing a measurement of the neighbor network entity during a measurement gap of the set of measurement gaps.

Some examples of the method, network entities, and non-transitory computer-readable medium described herein may further include operations, features, means, or instructions for receiving, from the UE, the measurement report indicating the signal quality measurement prediction based on an overlap of a first resource allocated for transmission of a data message and a second resource allocated for the measurement gap and transmit, the data message via the first resource.

Some examples of the method, network entities, and non-transitory computer-readable medium described herein may further include operations, features, means, or instructions for receive, from the UE, a report indicating that the UE may be going to skip performing a measurement during a measurement gap based on an overlap of a first resource allocated for reception of a data message and a second resource allocated for the measurement gap, where the control signaling instructing the UE to predict the signal quality measurement of the neighbor network entity using the perception information sensed by the UE may be based on the report and receive the data message via the first resource.

Some examples of the method, network entities, and non-transitory computer-readable medium described herein may further include operations, features, means, or instructions for receiving, from the UE, a message indicating that the UE may be going to skip performing a measurement during a measurement gap, where the control signaling instructing the UE to predict the signal quality measurement of the neighbor network entity using the perception information sensed by the UE may be based on the message and transmitting a message using resources of the measurement gap.

Some examples of the method, network entities, and non-transitory computer-readable medium described herein may further include operations, features, means, or instructions for transmitting, to the UE, an indication of a configuration of a set of measurement gaps for performing signal quality measurements of the neighbor network entity.

Some examples of the method, network entities, and non-transitory computer-readable medium described herein may further include operations, features, means, or instructions for receiving, from the UE, a request message to change a periodicity of the measurement gaps within the set of measurement gaps and transmitting, to the UE, an updated configuration of the set of measurement gaps, the updated configuration being in accordance with the change in the periodicity indicated via the request message.

Some examples of the method, network entities, and non-transitory computer-readable medium described herein may further include operations, features, means, or instructions for transmitting, to the UE, a control message indicating a signal quality threshold, where the request message to change the periodicity of the measurement gaps within the set of measurement gaps may be based on a signal quality measurement of the neighbor network entity satisfying the signal quality threshold.

In some examples of the method, network entities, and non-transitory computer-readable medium described herein, transmitting the request message may include operations, features, means, or instructions for transmitting, to the UE, a control message indicating a signal quality threshold, where the request message to change the periodicity of the measurement gaps within the set of measurement gaps may be based on the signal quality measurement prediction for the neighbor network entity failing to satisfy the signal quality threshold.

Some examples of the method, network entities, and non-transitory computer-readable medium described herein may further include operations, features, means, or instructions for receiving, from the UE, a message indicating that the UE may have generated spatial map of an environment, where transmitting the control signaling may be based on the message.

BRIEF DESCRIPTION OF THE DRAWINGS

FIGS. 13 through 17 show flowcharts illustrating methods that support techniques for enhanced measurement gaps using sensing procedures in accordance with one or more aspects of the present disclosure.

DETAILED DESCRIPTION

Figure 1:
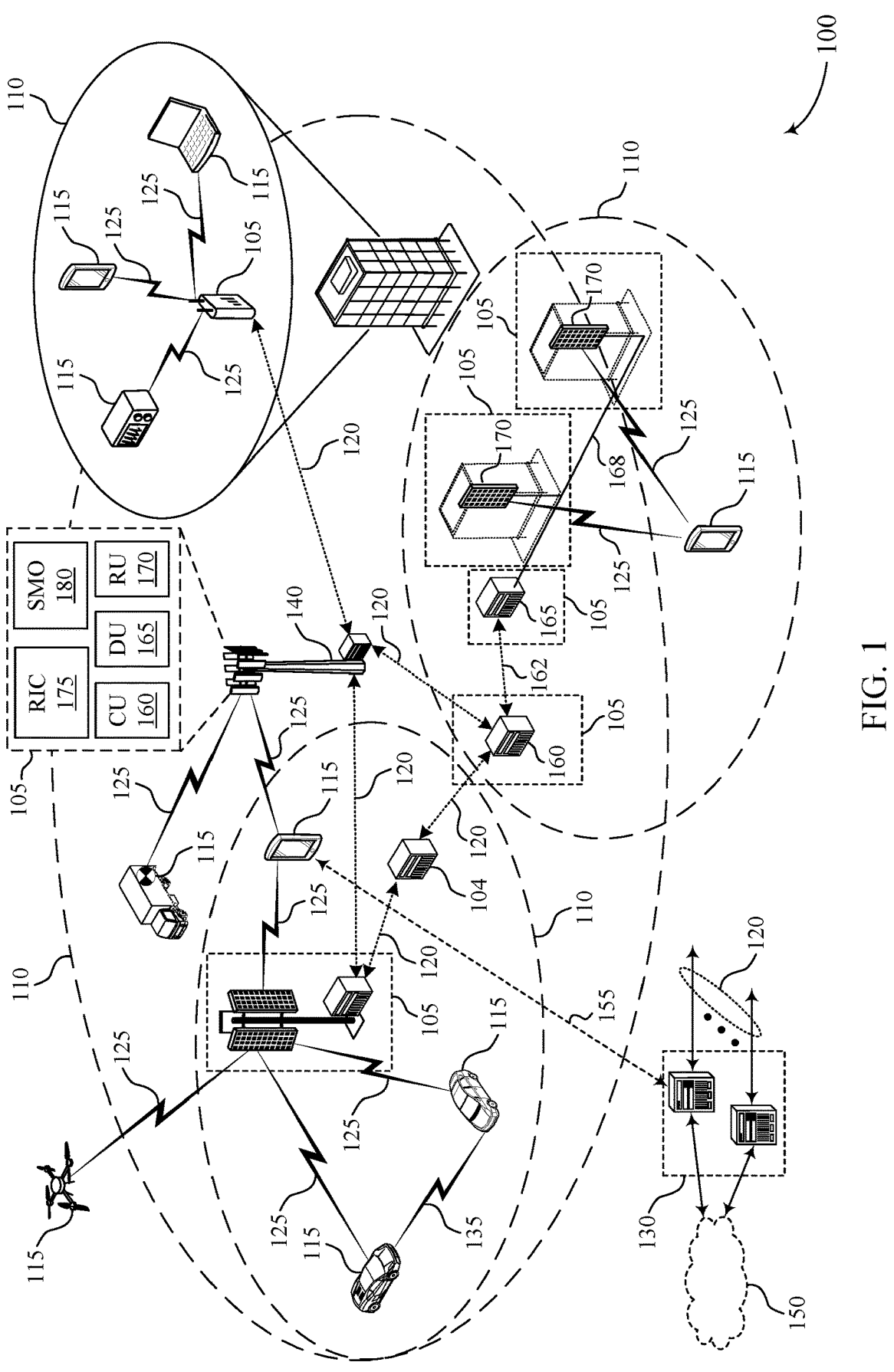
FIGS. 1 through 3 show examples of a wireless communications system that supports techniques for enhanced measurement gaps using sensing procedures in accordance with one or more aspects of the present disclosure.

Generally, fifth generation (5G) communications may provide high-speed, low-latency, and high-reliability wireless connections which may be especially important for extended reality (XR) devices and cloud computing services (e.g., cloud based gaming). XR data may include virtual reality (VR) data, augmented reality (AR) data, mixed reality (MR) data, and other types of data which may be associated with high reliability and low latency transmissions. As such, XR devices may have stringent system requirements for data rates, latency, and power consumption. In some cases, measurement gaps may be configured for XR devices (e.g., UEs) to operate in a multi-frequency cellular network. During a measurement gap a XR device may perform measurements on a cell of a different frequency. However, due to the measurement gap having a higher priority than normal data traffic, the XR device may be unable to receive any data traffic from their current serving cell while performing measurements on the cell of the different frequency. As such, the measurement gap configuration may increase the latency of the wireless communications system by delaying data transmissions therefore making it difficult for the wireless communications system to meet the system requirements of XR devices.

As such, a UE may receive instructions from a serving network entity to use perception information or sensing procedures to predict a signal quality measurement of a neighboring network entity. The UE may then transmit a measurement report including the predicted signal quality measurements. In some cases, the instructions may indicate whether the UE should cancel, skip, or change a measurement gap. Further, as XR devices may have a variety of different sensors, the UE may be capable of performing sensing procedures within an environment to obtain perception information of a cell to estimate the cell's signal quality (e.g., generate signal quality measurement predictions). By performing sensing procedures to determine to cancel, skip, or change a measurement gap configuration, the UE may be able to transmit data messages during a portion of the time previously allocated to a measurement gap. As such, the UE may be able to communicate with the serving network entity, while also providing signal quality measurements of the neighboring network entity, therefore reducing the latency of communications in the wireless communications system.

In one example, the UE may determine to cancel a measurement gap configuration based on the perception information and the UE may use perception information to provide the measurement values that would be obtained within the measurement gaps. In such example, the UE may refrain from having to prioritize a measurement gap over data transmissions, thus ensuring a decrease in delay of data transmissions. In another example, the UE may be configured with a set of measurement gaps and the UE may determine to transmit signaling to the serving network entity indicating that the UE is going to skip one of the measurement gaps based on perception information and prioritize data transmissions or receptions instead. For example, the UE may perform measurements in a first measurement gap and then determine that the perception information may be accurate enough. As such, the UE may skip performing a measurement during a second measurement gap and transmit or receive a data transmission during the second measurement gap while using the perception information to provide the signal quality predictions, which may aid in reducing the latency in the wireless communications system. In some other examples, the UE may transmit signaling to adapt or change the configuration of the measurement gaps based on the perception information. For example, the UE may determine that based on the perception information the UE may be capable of performing measurements less frequently and the UE may signal to change the parameters of the measurement gap such as the periodicity of the measurement gaps. As such, the time between the measurement gaps may be longer and the UE may be capable of transmitting or receiving additional data transmissions to further reduce the latency of the wireless communications system.

Based on whether the UE cancels, skips, or changes a measurement gap, the UE may transmit, a measurement report to the network entity serving the UE (e.g., the serving network entity) indicating signal quality measurements of the neighboring network entities based on the perception information. As such, by cancelling a measurement gap configuration, skipping a configured measurement gap, or adapting the configuration of a measurement gap, the latency of the wireless communications system caused by the measurement gaps may decrease as the UE may be capable of prioritizing data transmissions and receptions which may further improve the support for wireless devices, such as XR devices, within the wireless communications system.

Aspects of the disclosure are initially described in the context of wireless communications systems. Additional aspects of the disclosure are described with reference to wireless communications systems and a process flow Aspects of the disclosure are further illustrated by and described with reference to apparatus diagrams, system diagrams, and flowcharts that relate to techniques for enhanced measurement gaps using sensing procedures.

FIG. 1 shows an example of a wireless communications system 100 that supports techniques for enhanced measurement gaps using sensing procedures in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both.

For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for enhanced measurement gaps using sensing procedures as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHZ, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, the wireless communications system 100 may support 5G communications to provide high-speed, low-latency, and high-reliability wireless connections which may be especially important for XR devices and cloud computing services (e.g., cloud based gaming). XR data may include VR data, AR data, MR data, and other types of data which may be associated with high reliability and low latency transmissions. As such, XR devices may have stringent system requirements for data rates, latency, and power consumption that should be met. In some cases, measurement gaps may be configured for XR devices (e.g., UEs 115) to operate in a multi-frequency cellular network. During a measurement gap a XR device may perform measurements on a cell of a different frequency. However, due to the measurement gap having a higher priority than normal data traffic, the XR device may be unable to receive any data traffic from their current serving cell while performing measurements on the cell of the different frequency. As such, the measurement gap configurations may increase the latency of the wireless communications system therefore making it difficult for the wireless communications system to meet the system requirements of XR devices.

As such, a UE 115 (e.g., a UE 115 that may be an XR device) may receive instructions from a serving network entity 105 to use perception information or sensing procedures to predict a signal quality measurement of a neighboring network entity 105. The UE 115 may then transmit a measurement report to the serving network entity 105 including the predicted signal quality measurements. In some cases, the instructions may indicate whether the UE 115 should cancel, skip, or change a measurement gap. Further, as XR devices may have a variety of different sensors, the UE 115 may be capable of performing sensing procedures within an environment to obtain perception information of a cell to estimate the cell's signal quality. By performing sensing procedures to determine to cancel, skip, or change a measurement gap configuration, the UE 115 may be able to transmit data messages during a portion of the time previously allocated to a measurement gap. As such, the UE 115 may be able to communicate with the serving network entity 105, while also providing signal quality measurements of the neighboring network entity 105, therefore reducing the latency of communications in the wireless communications system 100.

In one example, the UE 115 may determine to cancel a measurement gap configuration based on the perception information and the UE 115 may use the perception information to provide the measurement values that would be obtained within the measurement gaps. In such example, the UE 115 may refrain from having to prioritize a measurement gap over data transmissions, thus ensuring a decrease in delay of data transmissions. In another example, the UE 115 may be configured with a set of measurement gaps and the UE 115 may determine to transmit signaling to the serving network entity 105 indicating that the UE 115 is going to skip one of the measurement gaps based on perception information to prioritize data transmissions or receptions. For example, the UE 115 may perform measurements in a first measurement gap and then determine that the perception information may be accurate enough to provide signal quality measurement prediction. As such, the UE 115 may skip a second measurement gap and transmit or receive data during the second measurement gap while using the perception information to generate a signal quality measurement prediction, which may aid in reducing the latency in the wireless communications system 100. In some other examples, the UE 115 may transmit signaling to the serving network entity 105 to adapt or change the configuration of the measurement gaps based on the perception information. For example, the UE 115 may determine that based on the perception information the UE 115 may be capable of performing measurements less frequently and the UE 115 may signal to change the parameters of the measurement gap such as the periodicity of the measurement gaps. As such, the time between the measurement gaps may be longer and the UE 115 may be capable of transmitting or receiving additional data transmissions to further reduce the latency of the wireless communications system 100.

Based on whether the UE 115 cancels, skips, or changes a measurement gap, the UE 115 may transmit, a measurement report to the network entity 105 serving the UE 115 (e.g., the serving network entity 105) indicating one or more signal quality measurements of the neighboring network entities 105 based on the perception information. As such, by cancelling a measurement gap configuration, skipping a configured measurement gap, or adapting the configuration of a measurement gap, the latency of the wireless communications system caused by the measurement gaps may decrease as the UE may be capable of prioritizing data transmissions and receptions which may further improve the support and data throughput for wireless devices, such as XR devices, within the wireless communications system 100.

Figure 2:
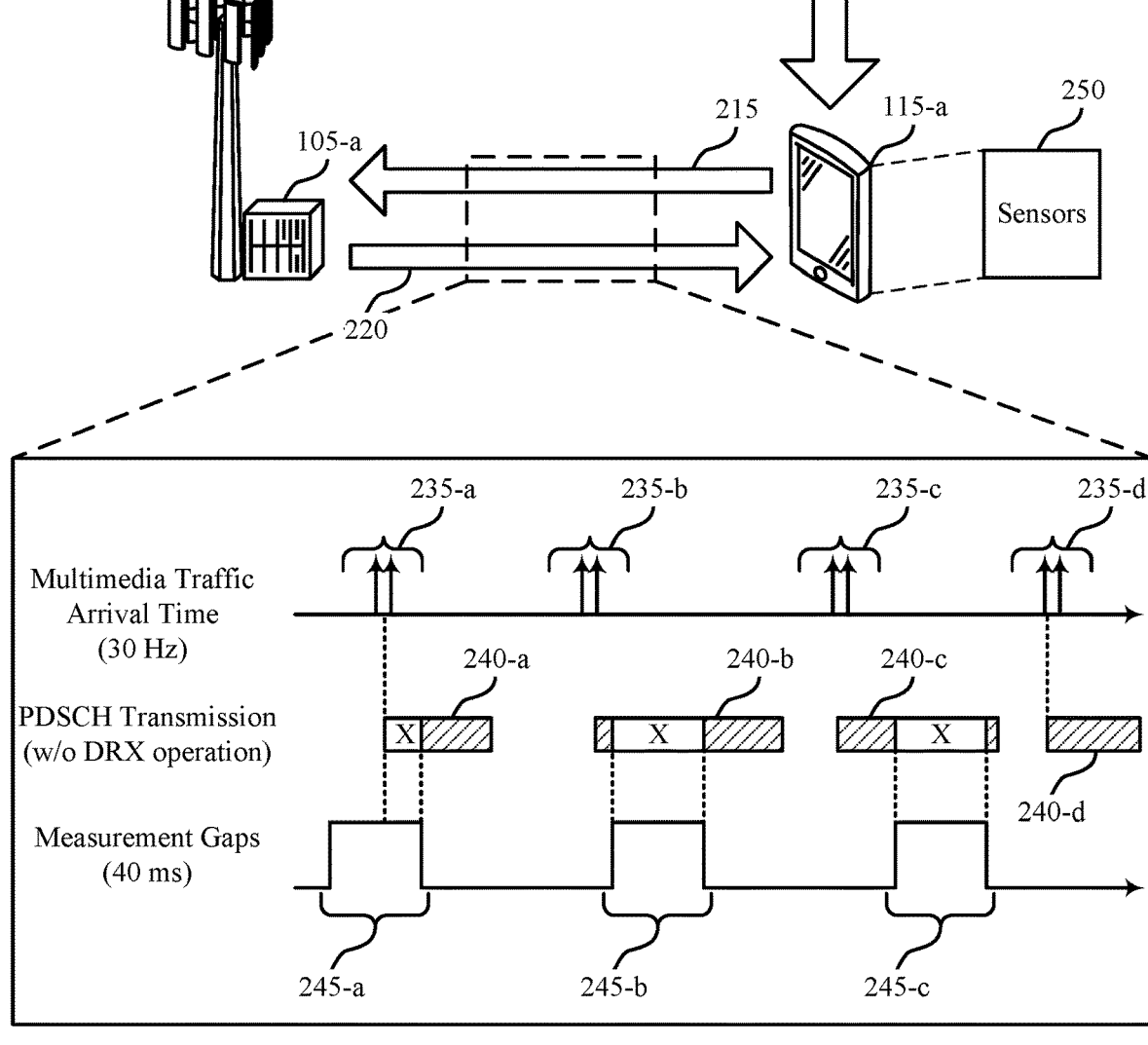

FIG. 2 shows an example of a wireless communications system 200 that supports techniques for enhanced measurement gaps using sensing procedures in accordance with one or more aspects of the present disclosure. In some examples, the wireless communications system 200 may implement or be implemented by the wireless communications system 100. For example, the wireless communications system 200 may include a UE 115-*a*, a network entity 105-*a*, a network entity 105-*b*, and a server 205 within a cloud 210, which may be examples of devices described herein with reference to FIG. 1. The UE 115-*a* may communicate with the network entity 105-*a* via an uplink communication link 215 and a downlink communication link 220, the network entity 105-*a* may communicate with the server 205 and the cloud 210 via a communication link 225, and the network entity 105-*b* may communicate with the UE 115-*a* via a communication link 230. In some examples, the uplink communication link 215, the downlink communication link 220, the communication link 225, and the communication link 230 may be examples of Uu links, sidelink links, backhaul links, D2D links, or some other type of communication links 125 described herein with reference to FIG. 1.

In some examples, the wireless communications system 200 may support 5G communications which may provide high-speed, low-latency, and high-reliability wireless connections. Such wireless connections may enable the wireless communications system 200 to support immersive XR multimedia and cloud computing services via the cloud 210 (e.g., AR glasses. VR Head-Mounted Display (HMD), cloud gaming, and cloud AI). In some cases, the wireless communications system 200 may support a split-XR architecture where XR computations may be split between an XR device (e.g., the UE 115-*a* or the network entity 105-*a*) and an XR server (e.g., the server 205) within the cloud 210 that the network entity 105-*a* may communicate with via the communication link 225. For example, for cloud-based gaming (e.g., via the cloud 210), the server 205 within the cloud 210 may perform video rendering for a video game to reduce the computation resource consumption and power consumption of the XR device. Further, the described XR devices and cloud computing applications may have stringent system constrains including data rate, latency, and power consumption requirements. For example, an XR device may dictate that 99 percent of XR traffic should be delivered within a packet delay budget (PDB) time limit (e.g., 10 milliseconds (ms)).

In some cases, the XR devices (e.g., the UE 115-*a*) may be within a multi-frequency cellular network. To enable the UE 115-*a* to be within the multi-frequency cellular network, the network entity 105-*a* may configure the UE 115-*a* with a set of radio resource management (RRM) measurement gaps 245 (e.g., a measurement gap 245-*a*, a measurement gap 245-*b*, and a measurement gap 245-*c*). During a configured measurement gap 245 the UE 115-*a* may be incapable of receiving any data from the network entity 105-*a* via the downlink communication link 220 and may be incapable of transmitting any data to the network entity via the uplink communication link 215. As such, the measurement gap 245 configuration may increase the packet delay for real-time multimedia traffic between the UE 115-*a* and the network entity 105-*a* via the uplink communication link 215 and the downlink communication link 220. Therefore, improvements of the measurement gaps 245 may enhance the user experience for XR applications.

During a measurement gap, the UE 115-*a* may measure one or more neighboring cells (e.g., neighboring network entities 105, the network entity 105-*b*) and other carrier components using different frequencies. However, most UEs 115 (e.g., such as the UE 115-*a*) may be equipped with a single radio frequency module to reduce the manufacturing cost and form factor size. As such, the UE 115-*a* may be unable to perform inter-frequency measurements while maintaining the data traffic with the serving cell (e.g., the network entity 105-*a*). Therefore, the UE 115-*a* may use the measurement gaps 245 and the UE 115-*a* may suspend communications with the network entity 105-*a* to perform one or more inter-frequency neighbor cell measurements or one or more inter-RAT measurements during the time period of a measurement gap 245. During a respective measurement gap 245, the UE 115-*a* may receive downlink transmissions (e.g., synchronization signal blocks (SSBs) from the network entity 105-*b* via the communication link 230 and the UE 115-*a* may measure the SSBs. As such, while the UE 115-*a* may measure the SSBs from the network entity 105-*b* the UE 115-*a* may be unable to receive any signals from the network entity 105-*a* via the downlink communication link 220 or transmit any signals to the network entity 105-*a* via the uplink communication link 215 during the period of the measurement gap 245 (e.g., a period of 40 ms).

In some examples, when the UE 115-*a* is preparing for an inter-frequency handover or an inter-RAT handover the UE 115-*a* may use a measurement gap 245. Further, the network entity 105-*a* may configure the measurement gaps for the UE 115-*a* for inter-frequency measurements, inter-RAT measurements, beam measurements, inter-frequency measurements, or any combination thereof when an active BWP may not configured with an SSB. As such, during a measurement gap 245 the UE 115-*a* may measure the target frequency of the network entity 105-*b* to perform the inter-frequency handover or the inter-RAT handover. Further, the UE 115-*a* may temporarily suspend communication with the serving cell (e.g., the network entity 105-*a*) during the measurement gap 245 to measure the inter-frequency of the network entity 105-*b*. That is, the UE 115-*a* may be incapable of transmitting physical uplink shared channel (PUSCH), sounding reference signals (SRS), or physical uplink control channel (PUCCH) transmissions or receiving physical downlink control channel (PDCCH) or physical downlink shared channel (PDSCH) transmissions during a measurement gap 245 except for transmission and reception activities related to random access channel (RACH) procedures. In some cases, the UE 115-*a* may be capable of receiving CSI-RSs during a measurement gap 245 but in some other cases, the UE 115-*a* may be incapable of receiving CSI-RSs during a measurement gap 245.

In some other examples, the UE 115-*a* may use a measurement gap 245 during a frequency range 2 (FR2) UE 115 receiving beam search for an intra-frequency handover to the network entity 105-*b* (e.g., when the network entity 105-*b* is within the same frequency of the network entity 105-*a*). While communicating with the network entity 105-*a*, the UE 115-*a* may direct a FR2 UE 115 receiving beam towards the network entity 105-*a*. As such, during the measurement gap 245 the UE 115-*a* may temporarily suspend communications with the network entity 105-*a* and redirect the receiving beam towards the target cell (e.g., the network entity 105-*b*). In another example, the UE 115-*a* may be configured with an active BWP which may not contain an intra-frequency SSB. In such cases, during the measurement gap 245, the UE 115-*a* may temporarily tune the transceiver of the UE 115-*a* to receive the intra-frequency SSB.

In addition, the UE 115-*a* may be configured such that the measurements gaps 245 may have a higher priority than data traffic (e.g., PDSCH, PUSCH). In some cases, a random access procedure may have a higher priority than both data traffic and measurement gaps 245 (e.g., message 2, 3, 4, A, or B (Msg2/3/4/A/B)). As such, the priority levels of the UE 115-*a* may be configured such that a PUSCH for Msg3/MsgA or a PDCCH for Msg2/Msg4/MsgB may have the highest level of priority. The measurement gaps 245 may have the second highest level of priority followed by data transmissions (e.g., HARQ, scheduling resource (SR), CSI, SRS, PUSCH, PDCCH, PDSCH). Therefore, during a measurement gap 245, a MAC entity of the UE 115-*a*, on the serving cell(s) in a corresponding frequency range of the measurement gap 245 configured with a measurement gap 245 configuration (e.g., measGapConfig), may follow a set of rules. For example, during a measurement gap 245, the UE 115-*a* may refrain from performing a transmission of HARQ feedback, of an SR, or a CSI, refrain from reporting SRSs, and may refrain from transmitting on the uplink shared channel (UL-SCH) except for Msg3 or the MsgA payload of a random access procedure. Additionally, or alternatively, if the random access response window (e.g., ra-ResponseWindow), the random access contention resolution timer (e.g., ra-ContentionResolutionTimer), or the MsgB response window (e.g., msgB-Response Window) are configured and running, the UE 115-*a* may monitor the PDCCH, otherwise the UE 115-*a* may refrain from monitoring the PDCCH, and may refrain from receiving transmissions on the downlink shared channel (DL-SCH).

Further, when a measurement gap 245 may be configured, the maximum UE 115 peak throughput of the UE 115-*a* may be reduced according to the measurement gap 245 length. As such, in some commercial networks, the measurement gaps 245 may be configured when the channel quality of a primary cell (e.g., the cell supported by the network entity 105-*a*) becomes less than a channel quality threshold (e.g., an A2 event driver). Thus, the configured measurement gaps 245 may interrupt the data transmissions of multimedia traffic (e.g., a traffic burst 235-*a*, a traffic burst 235-*b*, a traffic burst 235-*c*, or a traffic burst 235-*d*). For example, the periodicity of measurement gaps 245 may not be aligned with the multimedia periodicity.

As describe herein, since a measurement gap 245 may have a higher priority than the normal data traffic, the UE 115-*a* may refrain from receiving any traffic data (e.g., a PDSCH transmission 240-*a*, a PDSCH transmission 240-*b*, a PDSCH transmission 240-*c*, or a PDSCH transmission 240-*d*) from the network entity 105-*a* during the measurement gap 245 and a set of time for preparation of the measurement gap 245. For example, the PDSCH transmission 240-*a* may experience an interruption (e.g., illustrated by the box with an "X") based on partially overlapping with the measurement gap 245-*a*. However, in some examples, the PDSCH transmission 240-*b* and the PDSCH transmission 240-*c* may be completely overlapped with the measurement gap 245-*b* and the measurement gap 245-*c* respectively. As such, the network entity 105-*a* may have to spend more time transmitting the PDSCH transmission 240-*b* and the PDSCH transmission 240-*c* which may introduce additional latency into the wireless communications system. Therefore, the measurement gaps 245 may increase the transmission time for the traffic bursts 235 making it difficult for the XR device (e.g., the UE 115-*a*) to meet the PDB requirements of multimedia traffic. Further, for XR devices, prioritizing the measurement gaps 245 may impact the throughput of communications within the wireless communications system 200 as the XR devices may have stringent latency requirements (e.g., a PDB may be equal to 10 ms). As such, the impacts of the priority handling of the measurement gaps and data transmissions/receptions (e.g., reception of the PDSCH transmissions 240) may impact the capability of the UE 115-*a* performing mobility handovers.

To improve the use of the measurement gaps 245, the UE 115-*a* (e.g., an XR device) may use perception information. In many of the uses of XR (e.g., AR/VR devices, cloud computing, cloud gaming) the UE 115-*a* may have a set of sensors 250 (e.g., an inertial measurement unit (IMU) sensor 250, cameras) to build some perception (e.g., awareness) of an environment. For example, using sensing procedures via the set of sensors 250 of the UE 115-*a*, the UE 115-*a* may be able to determine an accurate estimation of a user's position and a six degree of freedom (6DoF) orientation (e.g., forward/backwards (sway), up/down (heave), left/right (sway), yaw (x-y axis), pitch (transverse axis), and roll (longitudinal axis)). In some cases, the UE 115-*a* may also be able to determine the user's position and orientation by combining the camera and IMU sensors 250 on the XR device. In another example, the UE 115-*a* may perform blockage detection using the sensors 250 and detect whether the link (e.g., the uplink communication link 215, the downlink communication link 220, or the communication link 230) may be blocked by an object (e.g., a fixed or static object). The UE 115-*a* may perform such detection using the camera sensors 250 of the UE 115-*a* or a processed version of the cameras (e.g., depth maps, three-dimensional (3D) reconstructions of the environment, spatial maps).

In some cases, the UE 115-*a* may detect a fixed object (e.g., a piece of furniture, a building) blocking the link, however, in some other cases, the UE 115-*a* may detect a dynamic object (e.g., a moving person) blocking the link. When detecting dynamic object blockage, the UE 115-*a* may perform some additional testing and predictions to predict how long the dynamic object may block the link. For example, the UE 115-*a* may use previously gathered perception information to determine that the dynamic object may block the link for a set period of time or to predict when the dynamic object may block the link next. Further, in some other examples, the UE 115-*a* may perform mobility and speed estimations of the user via IMU sensors 250 and the 6DoF orientation of a user.

Using these sensors 250, the UE 115-*a* may generate a spatial map of an environment. In some cases, the UE 115-*a* may be equipped with heat sensors 250 and cameras and the UE 115-*a* may generate a spatial (e.g., heat) map of an environment (e.g., a room that the UE 115-*a* may be within). The spatial map may correspond to measurements of a neighbor network entity at various locations within the environment (e.g., RSRP measurements that correspond to respective physical locations of the UE 115-*a* with an environment). The environment may be, for example, a particular room within a building, or may be an external environment that is outside of a building that corresponds to a particular geographic zone or area.

As such, the UE 115-*a* may also perform blockage detection to determine if an object is blocking the UE 115-*a* causing a degradation on a communication link between the UE 115-*a* and the network entity 105-*a* (e.g., the uplink communication link 215, the downlink communication link 220, or both). For example, when using mmW communications, if an object is blocking the communication link (e.g., an obstacle within a line of sight between the UE 115-*a* and the network entity 105-*a*), the wireless communications system 200 may experience a reduction in efficiency and reliability and experience an increase in latency. Therefore, the use of perception information may enhance the use of the measurement gaps 245 to ensure that the wireless communications system 200 may be capable of providing the high speed, low latency, and high reliability wireless connections for XR devices. Further descriptions of the use of perception information may be described elsewhere herein including with reference to FIGS. 3 and 4.

Figure 3:
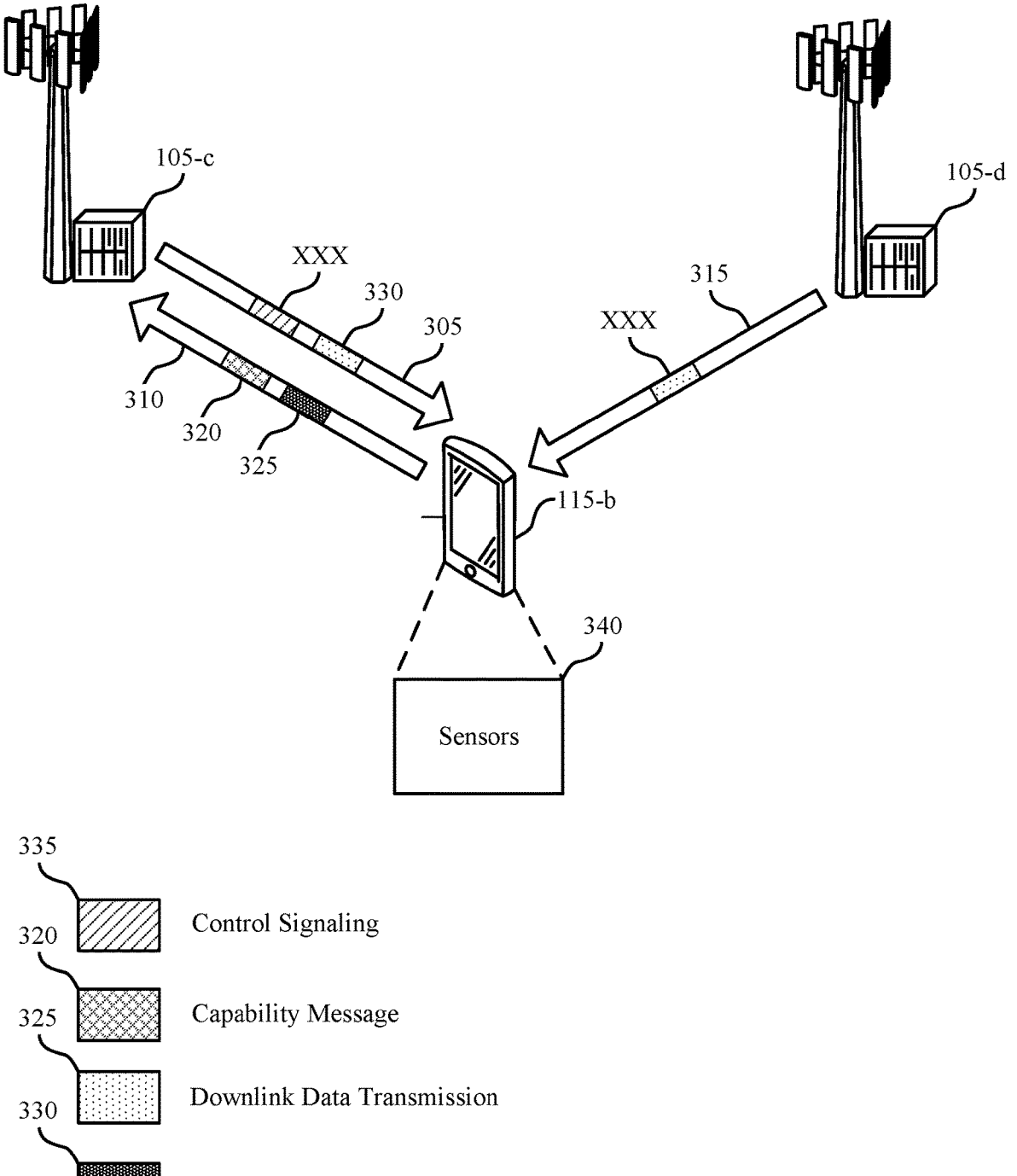

FIG. 3 shows an example of a wireless communications system 300 that supports techniques for enhanced measurement gaps using sensing procedures in accordance with one or more aspects of the present disclosure. In some examples, the wireless communications system 300 may implement or be implemented by the wireless communications system 100 or the wireless communications system 200. For example, the wireless communications system 300 may include a UE 115-*b*, a network entity 105-*c*, and a network entity 105-*d*, which may be examples of devices described herein with reference to FIG. 1. The UE 115-*a* may communicate with the network entity 105-*c* via a downlink communication link 305 and an uplink communication link 310 and the network entity 105-*d* may communicate with the UE 115-*b* via a downlink communication link 315. In some examples, the downlink communication link 305, the uplink communication link 310, and the downlink communication link 315 may be examples of Uu links, sidelink links, backhaul links, D2D links, or some other type of communication links 125 described herein with reference to FIG. 1.

To enhance the efficiency and the reliability of the wireless communications system 300 the UE 115-*b* may use perception information to decide whether to cancel, skip, or adapt measurement gaps. Such techniques described herein may allow for dynamic decisions on inter-frequency and intra-frequency measurement gap uses for XR devices (e.g., the UE 115-*b*). As such, the perception information may lead to less throughput disruptions within a serving cell (e.g., the cell supported by the network entity 105-*c*) and thus the wireless communications system 300 may be more reliable which may be imperative for latency sensitive applications (e.g., XR applications).

For example, inter-frequency and intra-frequency (e.g., when an active BWP does not have an SSB) RRM measurements within a measurement gap may be canceled based on perception information. That is, the network entity 105-*c* may be able to refrain from configuring measurement gaps and the perception information may provide the measurement values via precise location of the UE 115-*b* and radio frequency maps (e.g., reference signal receive power (RSRP) maps, spatial maps) of multiple cells. In some examples, inter-frequency and intra-frequency RRM measurements within a measurement gap may be skipped based on the perception information. In such examples, the network entity 105-*c* may configure the measurement gaps for the UE 115-*b* and based on the perception information the UE 115-*b*, the network entity 105-*c*, or both may determine or decide whether the UE 115-*b* should perform measurements within a respective measurement gap. For example, if the perception information indicates that the UE 115-*b* may be stationary or the UE 115-*b* may be moving in a direction of better coverage (e.g., higher signal quality), a measurement gap may be skipped. Additionally, or alternatively, the parameters of the measurement gaps for inter-frequency and intra-frequency RRM measurements may be adapted based on the perception information. Such parameters may include the periodicity of the measurement gaps (e.g., how often measurement gaps may be configured) or the threshold for using a measurement gap (e.g., a signal quality threshold). Further, the UE 115-*b*, the network entity 105-*c*, or both may generate the perception information and determine whether the measurement gaps should be canceled, skipped, or adapted.

In some examples, the UE 115-*b* may transmit a capability message 320 to the network entity 105-*c* (e.g., the serving network entity 105) via the uplink communication link 310. The capability message 320 may indicate that the UE 115-*b* may be capable of performing perception based RRM measurement predictions. As such, the UE 115-*b* may share the capability message 320 with the network entity 105-*c* during a capability exchange with the network entity 105-*c*. Accordingly, the network entity 105-*c* may configure the UE 115-*b* with a field either through an existing configuration (e.g., sMeasureConfig) or through an information element (IE) to perform the RRM measurements based on perception. The field may indicate to the UE 115-*b* to use perception for the RRM measurements (e.g., a predicted RRM measurement) rather than to use the measurement gaps. That is, the UE 115-*b* may determine one or more signal quality measurement predictions of the network entity 105-*d* rather than perform measurements, during a measurement gap, of SSBs transmitted from the network entity 105-*d* via the downlink communication link 315.

After the UE 115-*b* transmits the capability message 320, the network entity 105-*c* may enable the UE 115-*b* to use the perception information for predicting the signal quality measurements of the network entity 105-*d*. In some examples, the network entity 105-*c* may transmit such enabling message to the UE 115-*b* based on the IE and via a RRC or MAC-CE message. As such, the network entity 105-*c* may refrain from configuring the measurement gap occasions (e.g., the measurement gaps may be canceled since the UE 115-*b* may rely on the perception information to predict the signal quality measurements). Thus, when no measurement gaps are configured, there may be no interruption of data transmissions (e.g., downlink data transmissions 325 and uplink data transmissions 330) due to the measurement gaps.

In such example, the network entity 105-*c* may transmit control signaling 335 instructing the UE 115-*b* to predict the signal quality measurements of the network entity 105-*d* (e.g., the neighbor network entity 105) using perception information sensed by the UE 115-*b*. The UE 115-*b* may sense the perception information using the sensors 340 within a set of sensing procedures as described with reference to FIG. 2. Within the control signaling 335, the UE 115-*b* may be instructed to ignore any measurement gaps configured for a communication frequency or carrier. For example, the UE 115-*b* may be configured with a set of measurement gaps before the UE 115-*b*, the network entity 105-*c*, or both determine that the measurement gaps should be canceled based on the perception information and the control signaling 335 may instruct the UE 115-*b* to ignore the configured measurement gaps. Further, even though the UE 115-*b* may not perform signal quality measurements during a measurement gap, the UE 115-*b* may still be expected to transmit a measurement report. In such cases, the measurement report may instead be based on the perception information. Further, a handover for the UE 115-*b* from the network entity 105-*c* to the network entity 105-*d* may be triggered without the use of a measurement gap to measure the network entity 105-*d*, and instead the handover may be triggered based on the perception information indicated in the measurement report.

In some cases, to support predicting the signal quality measurements of the network entity 105-*d* may create spatial maps for the signal quality (e.g., RSRP, reference signal received quality (RSRQ), or any other signal quality metric, based on a geo-location of the UE 115-*b* within an environment) of different cells (e.g., primary cells and secondary cells) supported by different network entities 105 (e.g., the network entity 105-*d*). In some examples, the UE 115-*b* may use machine learning (ML) methods and models which may map position, pose and other environment information (e.g., via camera frames) to the signal quality (e.g., RSRP, RSRQ, etc.). As such, the UE 115-*b* may train and generate the ML model generate one or more spatial maps. The training may involve the UE 115-*b* making measurements within the environment for training the ML model to make predicted measurements based on current location of the UE 115-*b* within the environment.

Further, the UE 115-*b* may use the spatial maps and ML modes to estimate and predict the signal quality of different cells supported by different network entities (e.g., a cell supported by the network entity 105-*d*) in a given area. Using the signal quality measurement predictions from the spatial maps and ML models, the UE 115-*b* may aid in the network entity 105-*c* determining whether to handover the UE 115-*b* from the network entity 105-*c* (e.g., the serving network entity 105) to the network entity 105-*d* (e.g., the neighbor network entity 105).

In some examples, the spatial maps may represent maps of an environment which a user may be using an XR device (e.g., a room). In some cases, the spatial maps, ML models, or both may be trained using the accurate positioning output of perception (e.g., 6DoF positioning of the XR device). Further, the UE 115-*b* may store a set of spatial maps for a set of environments and based on the users (e.g., the UE 115-*b*) position (e.g., the position of the XR device). That is, the UE 115-*b* may use the ML models to generate multiple spatial maps for multiple different environments. Therefore, as the user leaves a first environment and enters a second, if the UE 115-*b* has a spatial map stored for the second environment, instead of having to retrain the UE 115-*b* with the spatial map of the second environment the UE 115-*b* may load the spatial map of the second environment. Additionally, or alternatively, the UE 115-*b*, the network entity 105-*c*, or both may store the set of spatial maps for the UE 115-*b* to load.

In some examples, the spatial maps may also be updated or fine-tuned in an online fashion based on changes in a respective environment detected via the perception information (e.g., the blockage detection described with reference to FIG. 2). In some other examples, there may be no spatial maps trained and the UE 115-*b* may be capable of performing signal quality measurement predictions via sensing procedures (e.g., via perception). As such, the network entity 105-*c* may configure a set of measurement gaps for the UE 115-*b* and instruct the UE 115-*b* via the control signaling 335 to perform signal quality measurements until the UE 115-*b* generates a spatial map of the current environment. Once generated, the UE 115-*b* may transmit a message indicating to the network entity 105-*c* that the spatial maps may be ready and the UE 115-*b* may be capable of switching to perception based signal quality measurements (e.g., signal quality measurement predictions). In some cases, the UE 115-*b* may transmit the message to the network entity 105-*c* via an uplink control information (UCI) message or via a UE assistance information (UAI) message. Additionally, or alternatively, the UE 115-*b* may use the measurement gaps to update a spatial map when the signal quality measurement predictions fall below a signal quality threshold and the perception information may no longer be reliable.

Further, in some examples, the network entity 105-*c* may configure the UE 115-*b* with an IE for perception using perception based measurement (e.g., IE RRMPerception) may transmit the control signaling 335 to instruct the UE 115-*b* to use both a measurement gap and the perception information to perform signal quality measurement of the network entity 105-*d*. As such, even though the priority of a measurement gap may be higher than the priority of data receptions (e.g., receiving downlink data transmissions 325) and data transmissions (e.g., transmitting uplink data transmissions 330), the UE 115-*b* may be capable of safely prioritizing data transmissions and receptions based on the UE 115-*b* being configured to use perception information as well as the measurement gap for the signal quality measurements. That is, when the data transmissions/receptions overlap with a measurement gap, the UE 115-*b* may be able to prioritize the data transmissions/receptions and perform data transmissions instead of measurements during a measurement gap without any impact on the wireless communications system 300.

For example, in the uplink, when a PUSCH may overlap with a measurement gap and the UE 115-*b* may be configured to use perception information used instead of the measurement gap. As such, the UE 115-*b* may prioritize the PUSCH transmission (e.g., transmission of the uplink data transmissions 330) over the measurement gap. For example, the UE 115-*b* may have a PUSCH transmission on a configured grant scheduled within a measurement gap or the UE 115-*b* may be requesting resources using a scheduling request (SR) and the SR may be flagged within the measurement gap. In such examples, the network entity 105-*c* may allocate a dynamic grant-PUSCH (DG-PUSCH) within the measurement gap as the UE 115-*b* may perform signal quality measurement predictions using the perception information instead of performing signal quality measurements within the measurement gap.

In the downlink, in some cases, a PDCCH may be outside a measurement gap, but a PDSCH may be within a measurement gap. For example, the UE 115-*b* may receive a downlink control information (DCI) and an offset value greater than zero (e.g., k0 offset>0) and the PDSCH may collide with the measurement gap, or the downlink traffic may be periodic and the packet may be expected on semi persistent scheduling (SPS). In such examples, the UE 115-*b* may be capable of prioritizing the reception of the PDSCH or downlink traffic (e.g., the reception of the downlink data transmissions 325) over the measurement gap. Further, when the UE 115-*b* prioritizes the reception of the downlink data transmissions 325, the UE 115-*b* may signal to the network entity 105-*c* that the UE 115-*b* may skip an upcoming measurement gap. In some cases, the UE 115-*b* may transmit such signal via a UCI message or a UAI message. If the UE 115-*b* does signal to the network entity 105-*c* that the UE 115-*b* will skip an upcoming measurement gap and prioritize the reception of the downlink data transmissions 325, the network entity 105-*c* may schedule a corresponding PDSCH. Otherwise, if the UE 115-*b* determines to use the measurement gap and measure the signal quality of the network entity 105-*d*, the network entity 105-*b* may save the resources associated with the PDSCH for another time. Additionally, or alternatively, a transmission of a PDCCH may collide with a measurement gap. As such, if the UE 115-*b* determines to receive the PDCCH, the UE 115-*b* may signal to the network entity 105-*c* (e.g., via a UCI message or a UAI message) that the UE 115-*b* will skip the upcoming measurement gap. When the UE 115-*b* signals to the network entity 105-*c* that the upcoming measurement gap will be skipped, the network entity 105-*c* may schedule the transmission of the PDCCH. Otherwise, the network entity 105-*c* may save the resources to be used later.

Additionally, or alternatively, the UE 115-*b* may adapt or change the configuration of the measurement gaps configured by the network entity 105-*c* for the UE 115-*b* for inter-frequency and intra-frequency signal quality measurements (e.g., RRM measurements). For example, the network entity 105-*c* may configure the UE 115-*b* with a signal quality threshold (e.g., RSRP/RSRQ threshold). The UE 115-*b* may be configured such that if the signal quality of the network entity 105-*d* is above the signal quality threshold, the UE 115-*b* may autonomously reduce the measurement gap periodicity. In some cases, instead of autonomously reducing the measurement gap periodicity, the UE 115-*b* may transmit a request message to the network entity 105-*c* using a UCI message, a UAI message, or a MAC-CE message, to request or suggest reducing the measurement gap periodicity.

Further, in some examples, when the UE 115-*b* is using the perception information to perform signal quality measurement predictions of the network entity 105-*c* the UE 115-*b* may detect that the perception quality of the perception information may be declining or may have already declined. For example, the signal quality measurements predicted based on the perception information may be below the signal quality threshold (e.g., the signal quality measurement predictions may fail to satisfy the signal quality threshold). As such, the UE 115-*b* may indicate via uplink signaling (e.g., UCI/MAC-CE/RRC message) to the network entity 105-*c* that measurement gaps may should be reconfigured. For example, the UE 115-*b* may have previously canceled the measurement gap configuration based on the perception information, however, if the perception quality of the perception information begins to decline the UE 115-*b* may retrain a spatial map of an environment, a ML model, or both.

To retrain the spatial map of an environment, the ML model, or both, the UE 115-*b* may use the measurement gaps of the reconfigured measurement gap configuration to perform signal quality measurements of the network entity 105-*d* until the UE 115-*b* may be confident that the signal quality measurement predictions will satisfy or be above the signal quality threshold. For example, the UE 115-*b* may generate a confidence score of the spatial map, the ML model, or both after each corresponding measurement gap. The confidence score may be a value between zero and one where a value of once may indicate that the spatial map or ML model may be 100 percent accurate. In some cases, the UE 115-*b* may keep performing measurement during measurement gaps until the confidence score of a spatial map, a ML model, or both satisfy or are above a confidence score threshold. In some other cases, the UE 115-*b* may keep performing measurements during measurement gaps until the UE 115-*b* may be able to predict signal quality measurements of the network entity 105-*d* that are above the signal quality threshold.

In addition, the UE **115-*b* may transmit assistance information (e.g., the position, pose, speed) from the sensors 340 to the network entity 105-*c*. As such, the network entity 105-*c* may determine whether to configure a set of measurement gaps for the UE 115-*b* or whether to adapt the measurement gap parameters (e.g., the periodicity of the measurement gaps). Additionally, or alternatively, handovers between inter-frequency cells may be spatially predicted instead of being reactive. That is, the network entity 105-*c*, the UE 115-*b*, or both may predict which network entity 105 the UE 115-*b* should handover to. Further, to predict the handover, the network entity 105-*c*, the UE 115-*b*, or both may predict the position of the user (e.g., the UE 115-*b*) in a given time frame (e.g., the next x-ms). As such, the predictions of which network entity 105 to handover the UE 115-*b*** based on the predicted position may be spatial.

Using the techniques of the present disclosure described herein with reference to FIGS. 2 and 3, the UE **115-*b* may use the perception information to enhance the efficiency and the reliability of the wireless communications system 300. Additionally, or alternatively, the techniques of the present disclosure may be used for radio link measurements (RLM) for frequency range 2 (FR2), multiple universal subscriber identity modules (MUSIM) gaps, positioning gaps, cross-link interference, or any combination thereof, where the UE 115-*b* may use the perception information rather than performing measurements. Further descriptions of the techniques of the present disclosure may be described elsewhere herein, including with reference to FIG. 4**.

Figure 4:
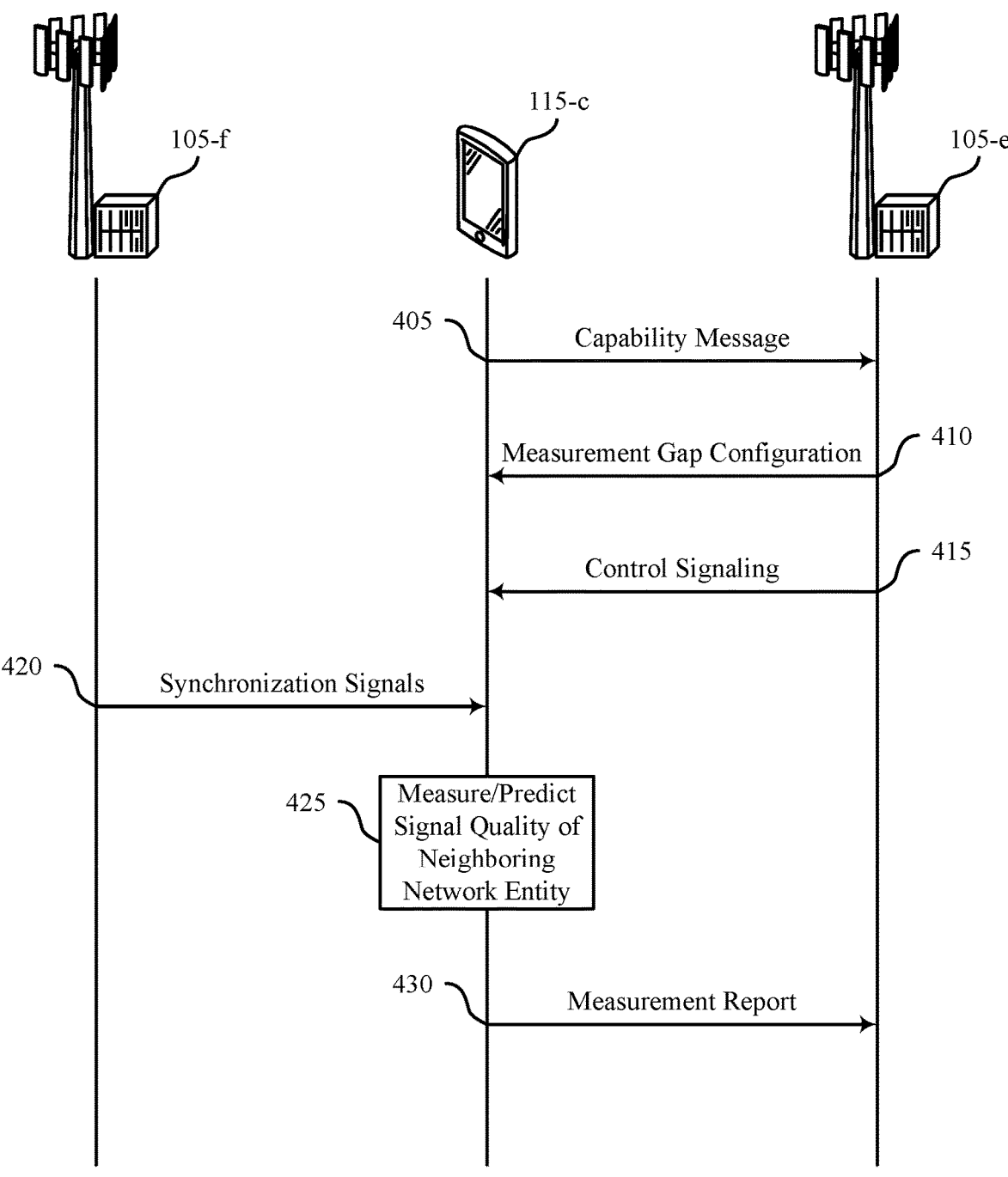
FIG. 4 shows an example of a process flow that supports techniques for enhanced measurement gaps using sensing procedures in accordance with one or more aspects of the present disclosure.

FIG. 4 shows an example of a process flow 400 that supports techniques for enhanced measurement gaps using sensing procedures in accordance with one or more aspects of the present disclosure. In some examples, the process flow 400 may implement or be implemented by the wireless communications system 100, the wireless communications system 200, and/or the wireless communications system 300. For example, the process flow 400 may include a UE **115-*c*, a network entity 105-*e*, and a network entity 105-*f*, which may be examples of devices described herein with reference to FIG. 1**.

In the following description of the process flow 400, the operations between the UE **115-*c*, the network entity 105-*e*, and the network entity 105-*f* may be performed in different orders or at different times. Some operations may also be left out of the process flow 400, or other operations may be added. Although the UE 115-*c*, the network entity 105-*e*, and the network entity 105-*f* are shown performing the operations of the process flow 400**, some aspects of some operations may also be performed by one or more other wireless devices.

At 405, the UE **115-*c* may transmit, to the network entity 105-*e*, a capability message indicating a capability to predict signal quality measurements using perception information sensed by the UE. In some cases, at 410, the UE 115-*c* may then receive, from the network entity 105-*e* (e.g., the serving network entity 105), an indication of a configuration of a set of measurement gaps for performing signal quality measurements of the network entity 105-*f* (e.g., the neighbor network entity 105). In some cases, the UE 115-*c* may transmit, to the network entity 105-*e*, a request message to change a periodicity of the measurement gaps within the set of measurement gaps. As such, the UE 115-*c* may receive, from the network entity 105-*e***, an updated configuration of the set of measurement gaps, the updated configuration being in accordance with the change in the periodicity indicated via the request message.

At 415, the UE **115-*c* may receive, from the network entity 105-*e*, control signaling instructing the UE 115-*c* to predict a signal quality measurement of a neighbor network entity using the perception information sensed by the UE 115-*c*. In some cases, the UE 115-*c* may receive the control signaling based on transmitting the capability message to the network entity 105-*e* at 405. In some examples, the control signaling may instruct the UE 115-*c* to perform a measurement of the network entity 105-*f* during a measurement gap (e.g., a measurement of the set of measurement gaps configured at 410) and to predict a signal quality measurement of the network entity 105-*f*** using the perception information.

Further, in some cases, the UE **115-*c* may transmit, to the network entity 105-*e*, a message indicating that the UE is to skip performing a measurement during a measurement gap. As such, the control signaling instructing the UE to predict the signal quality measurement of the network entity 105-*f* using the perception information sensed by the UE 115-*c* may be based on the UE 115-*c* transmitting the message. Additionally, or alternatively, the UE 115-*c* may then receive, from the network entity 105-*e*** a data message during the measurement gap.

At 420, the network entity **105-*f* (e.g., the neighbor network entity 105) may transmit, to the UE 115-*c*, one or more synchronization signals (e.g., SSBs) to the UE 115-*c* during a measurement gap. In some examples, the UE 115-*c* may measure the one or more synchronization signals received from the network entity 105-*f* during the measurement gap. As such, at 425, the UE 115-*c* may measure the signal quality of the network entity 105-*f*** for a measurement report.

In some other examples, the UE **115-*c* may determine to refrain from measuring the one or more synchronization signals and at 425 the UE 115-*c* may use the perception information sensed by the UE 115-*c* to predict the signal quality measurements of the network entity 105-*e*. For example, the UE 115-*c* may skip performing the signal quality measurement of the network entity 105-*f* during at least one measurement of the set of measurement gaps configured at 410. As such, at 425, the UE 115-*c* may predict the signal quality measurement of the network entity 105-*f* using the perception information sensed by the UE 115-*c* during the at least one measurement gap of the set of measurement gaps. In some cases, the UE 115-*c* may receive, from the network entity 105-*e*, a control message indicating a signal quality threshold. As such, the UE 115-*c* may transmit the request message to change the periodicity of the measurement gaps within the set of measurement gaps configured at 410 based on a signal quality measurement performed at 425 satisfying the signal quality threshold. Additionally, or alternatively, the UE 115-*c* may transmit the request message to change the periodicity of the measurement gaps within the set of measurement gaps based on a signal quality measurement prediction performed at 425** failing to satisfy the signal quality threshold.

In some cases, the signal quality measurement predictions performed at 425 may be based on a spatial map of an environment at the UE **115-*c*. In some examples, the UE 115-*c* may generate the spatial map of the environment by performing signal quality measurement during a set of signal quality measurements during the set of measurement gaps. The UE 115-*c* may then transmit, to the network entity 105-*e*, a message indicating that the spatial map of the environment is generated. As such, the UE 115-*c* may receive the control signaling at 415** based on the message indicating that the spatial map of the environment is generated. Further, the spatial map of the environment may be generated using a ML model.

At 430, the UE 115-*c* may transmit, to the network entity 105-*e*, a measurement report indicating the signal quality measurement prediction for the network entity 105-*f* based on the control signaling received at 415 and the perception information sensed by the UE 115-*c*. Further, in some cases the measurement report may indicate that the UE 115-*c* skipped performing the measurement of the network entity 105-*f* during a measurement gap and the UE 115-*c* may transmit, to the network entity 105-*e*, or receive, from the network entity 105-*e*, a message via resources of the measurement gap.

Figure 5:
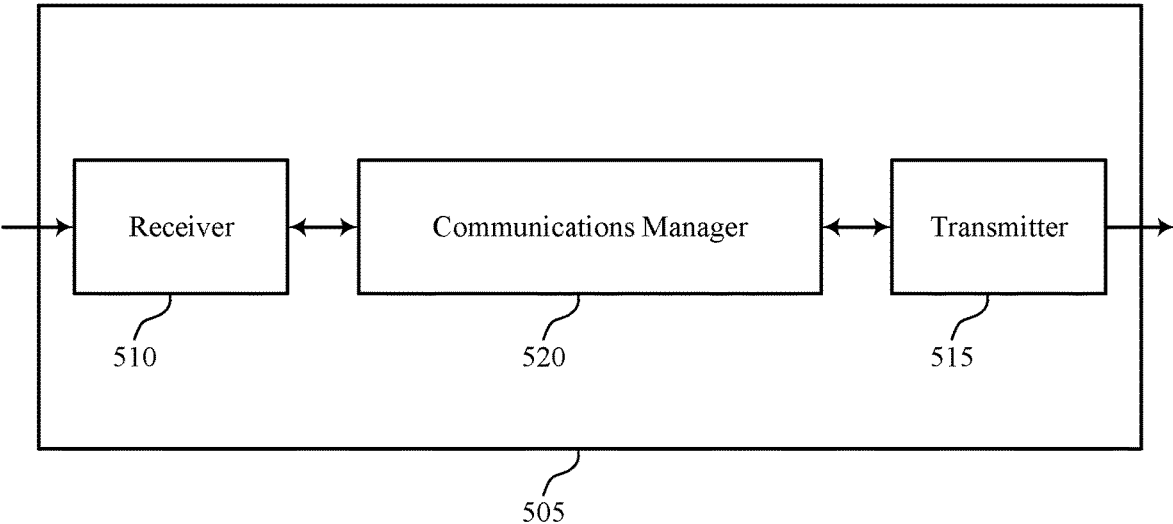
FIGS. 5 and 6 show block diagrams of devices that support techniques for enhanced measurement gaps using sensing procedures in accordance with one or more aspects of the present disclosure.

FIG. 5 shows a block diagram 500 of a device 505 that supports techniques for enhanced measurement gaps using sensing procedures in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for enhanced measurement gaps using sensing procedures). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for enhanced measurement gaps using sensing procedures). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for enhanced measurement gaps using sensing procedures as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor. If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. For example, the communications manager 520 is capable of, configured to, or operable to support a means for receiving, from a serving network entity, control signaling instructing the UE to predict a signal quality measurement of a neighbor network entity using perception information sensed by the UE. The communications manager 520 is capable of, configured to, or operable to support a means for transmitting, to the serving network entity, a measurement report indicating a signal quality measurement prediction for the neighbor network entity based on the control signaling and the perception information sensed by the UE.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for a UE 115 to use perception information to predict a signal quality measurement of a neighbor network entity 105 for reduced processing, reduced power consumption and a more efficient utilization of communication resources.

Figure 6:
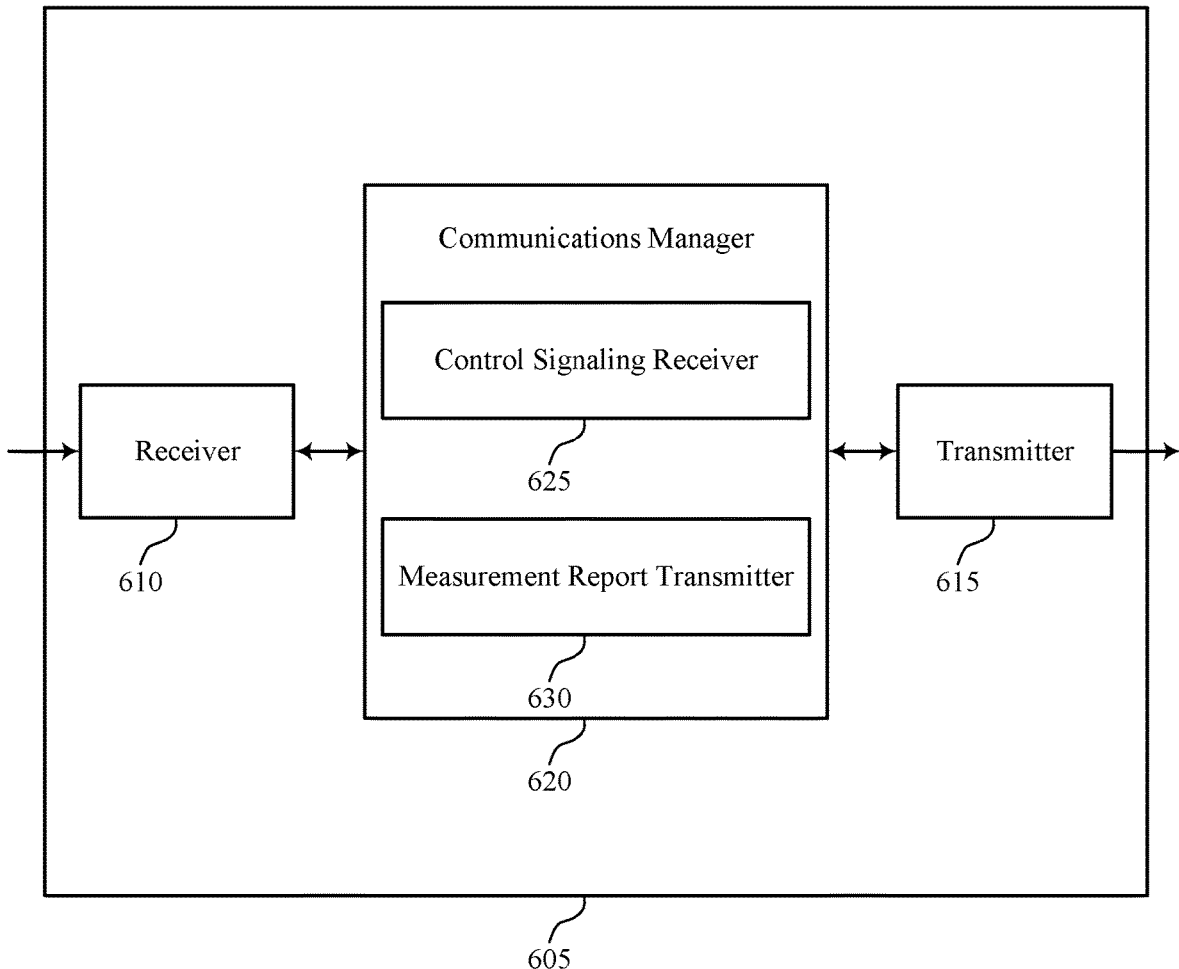

FIG. 6 shows a block diagram 600 of a device 605 that supports techniques for enhanced measurement gaps using sensing procedures in accordance with one or more aspects of the present disclosure. The device 605 may be an example of aspects of a device 505 or a UE 115 as described herein. The device 605 may include a receiver 610, a transmitter 615, and a communications manager 620. The device 605, or one of more components of the device 605 (e.g., the receiver 610, the transmitter 615, and the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for enhanced measurement gaps using sensing procedures). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for enhanced measurement gaps using sensing procedures). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for enhanced measurement gaps using sensing procedures as described herein. For example, the communications manager 620 may include a control signaling receiver 625 a measurement report transmitter 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. The control signaling receiver 625 is capable of, configured to, or operable to support a means for receiving, from a serving network entity, control signaling instructing the UE to predict a signal quality measurement of a neighbor network entity using perception information sensed by the UE. The measurement report transmitter 630 is capable of, configured to, or operable to support a means for transmitting, to the serving network entity, a measurement report indicating a signal quality measurement prediction for the neighbor network entity based on the control signaling and the perception information sensed by the UE.

Figure 7:
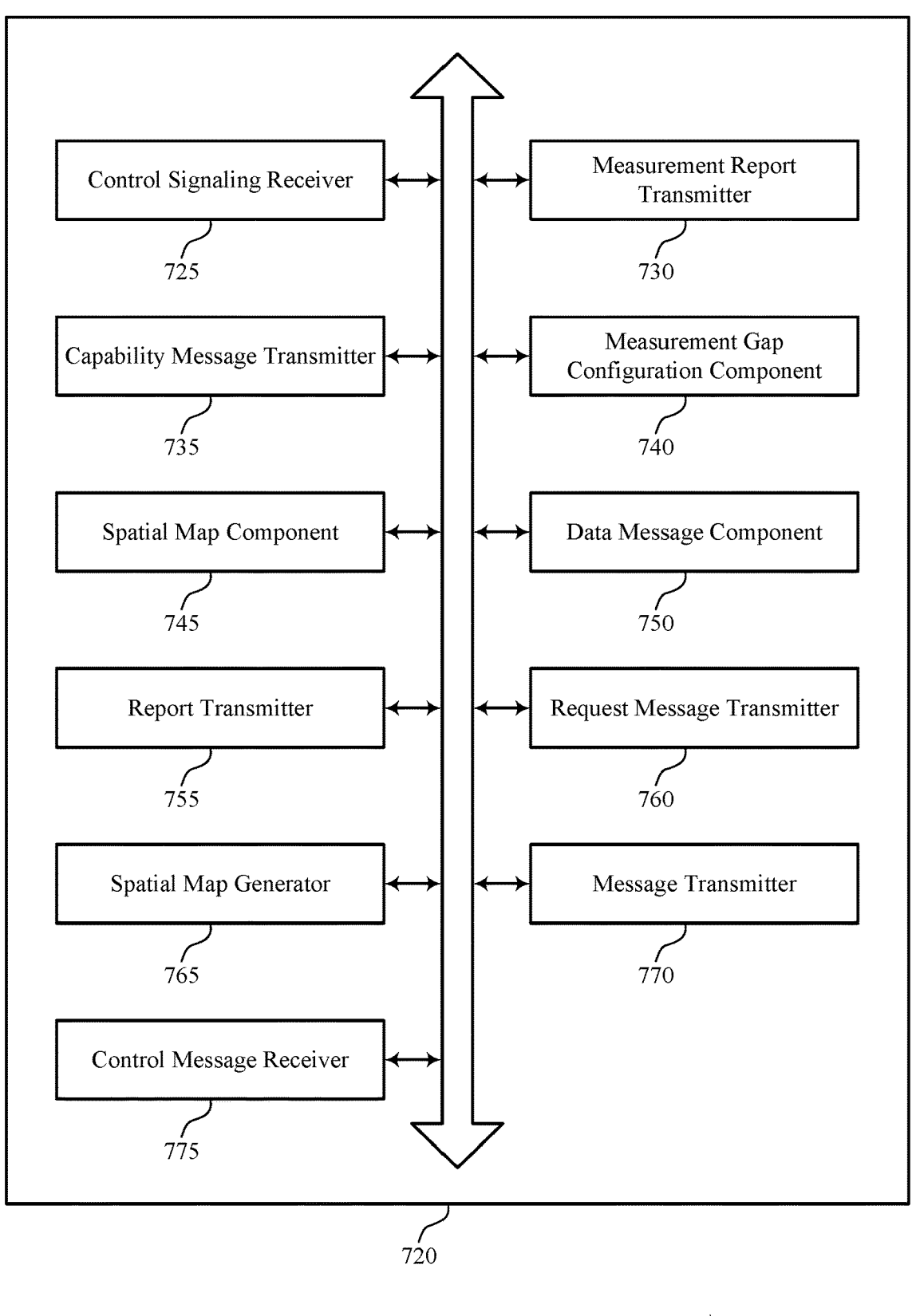
FIG. 7 shows a block diagram of a communications manager that supports techniques for enhanced measurement gaps using sensing procedures in accordance with one or more aspects of the present disclosure.

FIG. 7 shows a block diagram 700 of a communications manager 720 that supports techniques for enhanced measurement gaps using sensing procedures in accordance with one or more aspects of the present disclosure. The communications manager 720 may be an example of aspects of a communications manager 520, a communications manager 620, or both, as described herein. The communications manager 720, or various components thereof, may be an example of means for performing various aspects of techniques for enhanced measurement gaps using sensing procedures as described herein. For example, the communications manager 720 may include a control signaling receiver 725, a measurement report transmitter 730, a capability message transmitter 735, a message component 740, a data message component 745, a measurement gap configuration component 75040, a spatial map component 745, a data message component 750, a report transmitter 755, a request message transmitter 760, a spatial map generator 765, a message transmitter 770, a control message receiver 775, or any combination thereof. Each of these components, or components or subcomponents thereof (e.g., one or more processors, one or more memories), may communicate, directly or indirectly, with one another (e.g., via one or more buses).

The communications manager 720 may support wireless communications in accordance with examples as disclosed herein. The control signaling receiver 725 is capable of, configured to, or operable to support a means for receiving, from a serving network entity, control signaling instructing the UE to predict a signal quality measurement of a neighbor network entity using perception information sensed by the UE. The measurement report transmitter 730 is capable of, configured to, or operable to support a means for transmitting, to the serving network entity, a measurement report indicating a signal quality measurement prediction for the neighbor network entity based on the control signaling and the perception information sensed by the UE.

In some examples, the capability message transmitter 735 is capable of, configured to, or operable to support a means for transmitting, to the serving network entity, a capability message indicating a capability to predict signal quality measurements using the perception information sensed by the UE, where the control signaling is based on the capability message.

In some examples, the control signaling receiver 725 is capable of, configured to, or operable to support a means for receiving, from the serving network entity, an indication of a configuration of a set of measurement gaps for performing signal quality measurements of the neighbor network entity, where the control signaling instructs the UE to predict the signal quality measurement of the neighbor network entity using the perception information to instead of performing a measurement of the neighbor network entity during a measurement gap of the set of measurement gaps.

In some examples, the measurement report transmitter 730 is capable of, configured to, or operable to support a means for transmitting, to the serving network entity, the measurement report indicating the signal quality measurement prediction based on an overlap of a first resource allocated for transmission of a data message and a second resource allocated for the measurement gap. In some examples, the data message component 750 is capable of, configured to, or operable to support a means for transmitting the data message via the first resource.

In some examples, the report transmitter 755 is capable of, configured to, or operable to support a means for transmitting, to the serving network entity, a report indicating that the UE is skipping performing a measurement during a measurement gap based on an overlap of a first resource allocated for reception of a data message and a second resource allocated for the measurement gap, where the control signaling instructing the UE to predict the signal quality measurement of the neighbor network entity using the perception information sensed by the UE is based on the report. In some examples, the data message component 750 is capable of, configured to, or operable to support a means for receiving the data message via the first resource.

In some examples, the measurement gap configuration component 740 is capable of, configured to, or operable to support a means for receiving, from the serving network entity, an indication of a configuration of a set of measurement gaps for performing signal quality measurements of the neighbor network entity.

In some examples, the request message transmitter 760 is capable of, configured to, or operable to support a means for transmitting, to the serving network entity, a request message to change a periodicity of the measurement gaps within the set of measurement gaps. In some examples, the measurement gap configuration component 740 is capable of, configured to, or operable to support a means for receiving, from the serving network entity, an updated configuration of the set of measurement gaps, the updated configuration being in accordance with the change in the periodicity indicated via the request message.

In some examples, the control message receiver 775 is capable of, configured to, or operable to support a means for receiving, from the serving network entity, a control message indicating a signal quality threshold, where the request message to change the periodicity of the measurement gaps within the set of measurement gaps is based on a signal quality measurement of the neighbor network entity satisfying the signal quality threshold.

In some examples, to support transmitting the request message, the control message receiver 775 is capable of, configured to, or operable to support a means for receiving, from the serving network entity, a control message indicating a signal quality threshold, where the request message to change the periodicity of the measurement gaps within the set of measurement gaps is based on the signal quality measurement prediction for the neighbor network entity failing to satisfy the signal quality threshold.

In some examples, the UE to refrains from performing a measurement during at least one measurement gap of the set of measurement gaps based on the control signaling.

In some examples, the signal quality measurement prediction is based on a spatial map of an environment.

In some examples, the spatial map generator 765 is capable of, configured to, or operable to support a means for generating the spatial map of the environment by performing signal quality measurements during a set of signal quality measurements. In some examples, the message transmitter 770 is capable of, configured to, or operable to support a means for transmitting, to the serving network entity, a message indicating that the spatial map of the environment is generated, where receiving the control signaling is based on the message.

In some examples, the spatial map of the environment is generated using a machine learning model.

Figure 8:
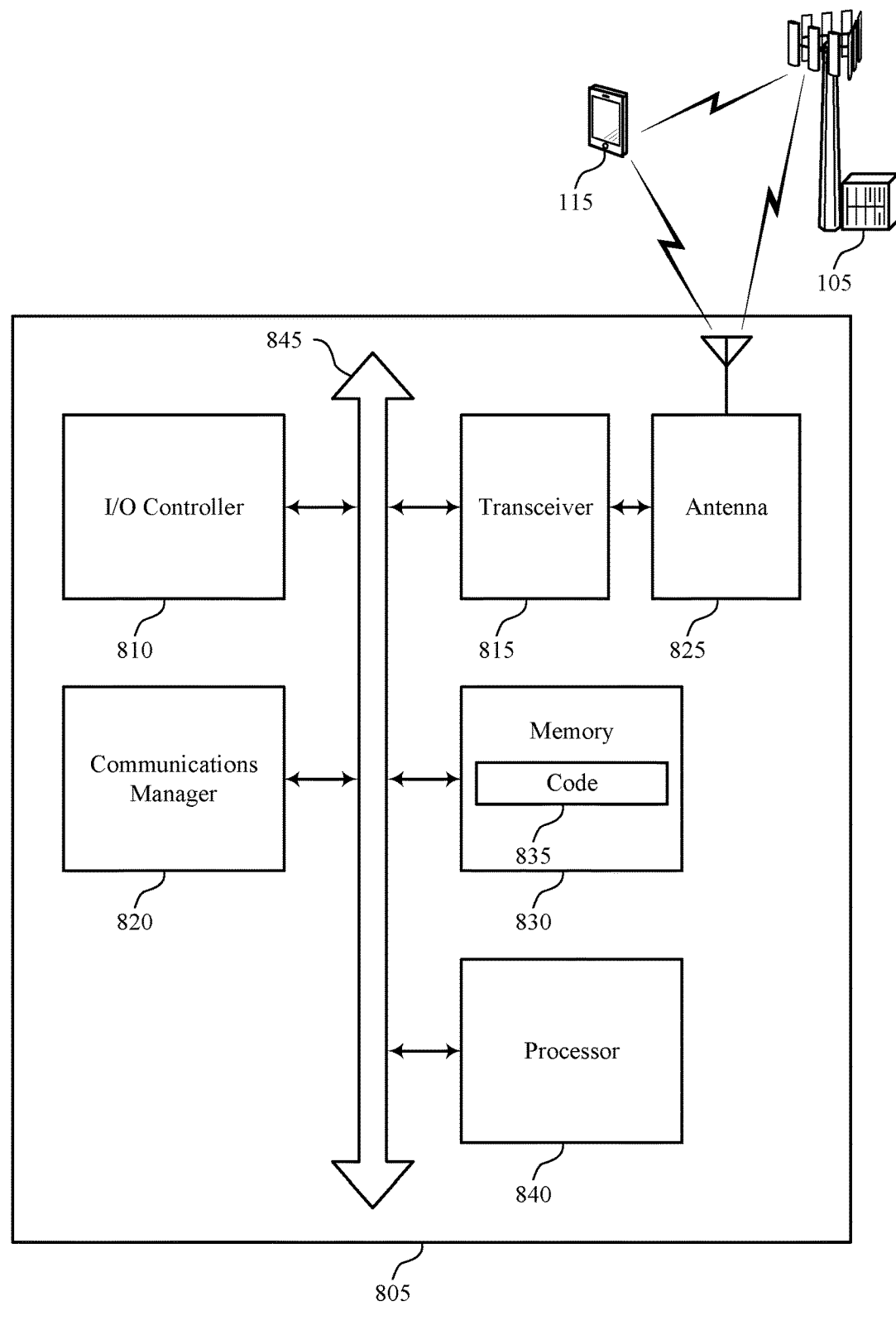
FIG. 8 shows a diagram of a system including a device that supports techniques for enhanced measurement gaps using sensing procedures in accordance with one or more aspects of the present disclosure.

FIG. 8 shows a diagram of a system 800 including a device 805 that supports techniques for enhanced measurement gaps using sensing procedures in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable code 835 including instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may contain, among other things, a basic I/O system (BIOS) which may control basic hardware or software operation such as the interaction with peripheral components or devices.

The at least one processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting techniques for enhanced measurement gaps using sensing procedures). For example, the device 805 or a component of the device 805 may include at least one processor 840 and at least one memory 830 coupled with or to the at least one processor 840, the at least one processor 840 and at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions herein. In some examples, the at least one processor 840 may be a component of a processing system, which may refer to a system (such as a series) of machines, circuitry (including, for example, one or both of processor circuitry (which may include the at least one processor 840) and memory circuitry (which may include the at least one memory 830)), or components, that receives or obtains inputs and processes the inputs to produce, generate, or obtain a set of outputs. The processing system may be configured to perform one or more of the functions described herein. As such, the at least one processor 840 or a processing system including the at least one processor 840 may be configured to, configurable to, or operable to cause the device 805 to perform one or more of the functions described herein. Further, as described herein, being "configured to," being "configurable to," and being "operable to" may be used interchangeably and may be associated with a capability, when executing code stored in the at least one memory 830 or otherwise, to perform one or more of the functions described herein.

The communications manager 820 may support wireless communications in accordance with examples as disclosed herein. For example, the communications manager 820 is capable of, configured to, or operable to support a means for receiving, from a serving network entity, control signaling instructing the UE to predict a signal quality measurement of a neighbor network entity using perception information sensed by the UE. The communications manager 820 is capable of, configured to, or operable to support a means for transmitting, to the serving network entity, a measurement report indicating a signal quality measurement prediction for the neighbor network entity based on the control signaling and the perception information sensed by the UE.

By including or configuring the communications manager 820 in accordance with examples as described herein, the device 805 may support techniques for a UE 115 to use perception information to predict a signal quality measurement of a neighbor network entity 105 for improved communication reliability, reduced latency, improved user experience related to reduced processing, reduced power consumption, more efficient utilization of communication resources, improved coordination between devices, and an improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of techniques for enhanced measurement gaps using sensing procedures as described herein, or the at least one processor 840 and the at least one memory 830 may be otherwise configured to, individually or collectively, perform or support such operations.

Figure 9:
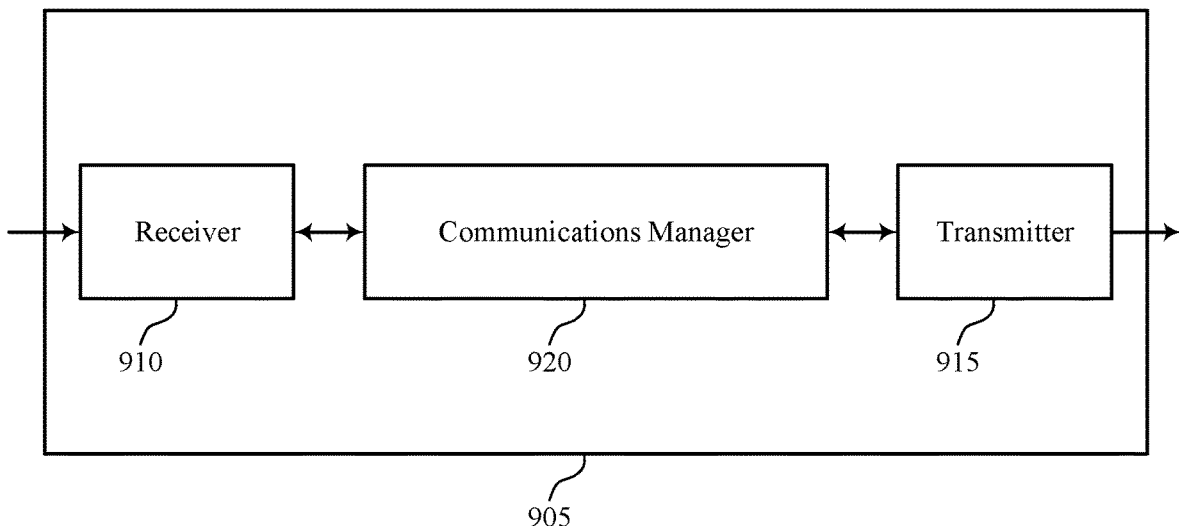
FIGS. 9 and 10 show block diagrams of devices that support techniques for enhanced measurement gaps using sensing procedures in accordance with one or more aspects of the present disclosure.

FIG. 9 shows a block diagram 900 of a device 905 that supports techniques for enhanced measurement gaps using sensing procedures in accordance with one or more aspects of the present disclosure. The device 905 may be an example of aspects of a network entity 105 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of techniques for enhanced measurement gaps using sensing procedures as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor. If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. For example, the communications manager 920 is capable of, configured to, or operable to support a means for transmitting, to a UE, control signaling instructing the UE to predict a signal quality measurement of a neighbor network entity using perception information sensed by the UE. The communications manager 920 is capable of, configured to, or operable to support a means for receiving, from the UE, a measurement report indicating a signal quality measurement prediction for the neighbor network entity based on the control signaling and the perception information sensed by the UE.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for a UE 115 to use perception information to predict a signal quality measurement of a neighbor network entity 105 for reduced processing, reduced power consumption, and an more efficient utilization of communication resources.

Figure 10:
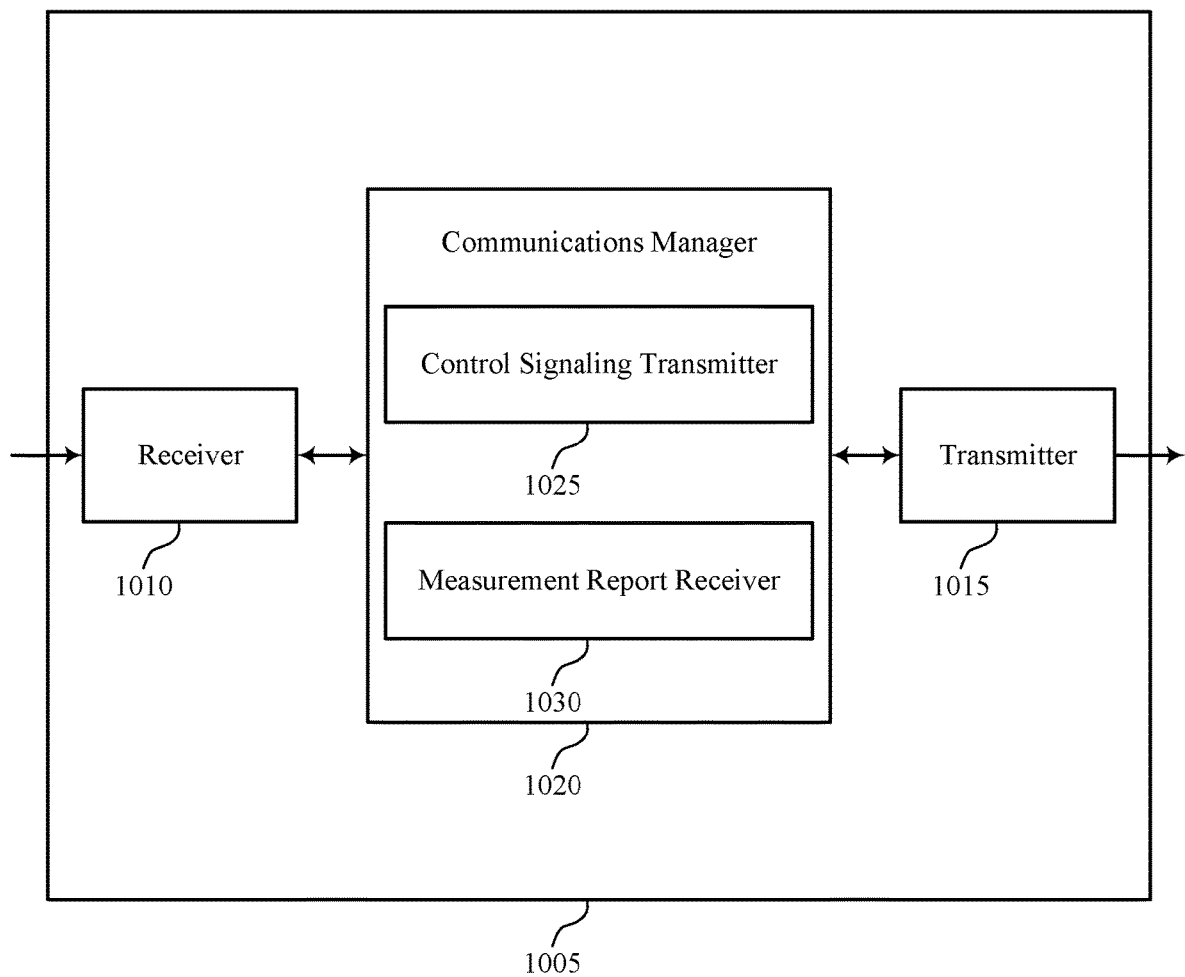

FIG. 10 shows a block diagram 1000 of a device 1005 that supports techniques for enhanced measurement gaps using sensing procedures in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005, or one of more components of the device 1005 (e.g., the receiver 1010, the transmitter 1015, and the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of techniques for enhanced measurement gaps using sensing procedures as described herein. For example, the communications manager 1020 may include a control signaling transmitter 1025 a measurement report receiver 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. The control signaling transmitter 1025 is capable of, configured to, or operable to support a means for transmitting, to a UE, control signaling instructing the UE to predict a signal quality measurement of a neighbor network entity using perception information sensed by the UE. The measurement report receiver 1030 is capable of, configured to, or operable to support a means for receiving, from the UE, a measurement report indicating a signal quality measurement prediction for the neighbor network entity based on the control signaling and the perception information sensed by the UE.

Figure 11:
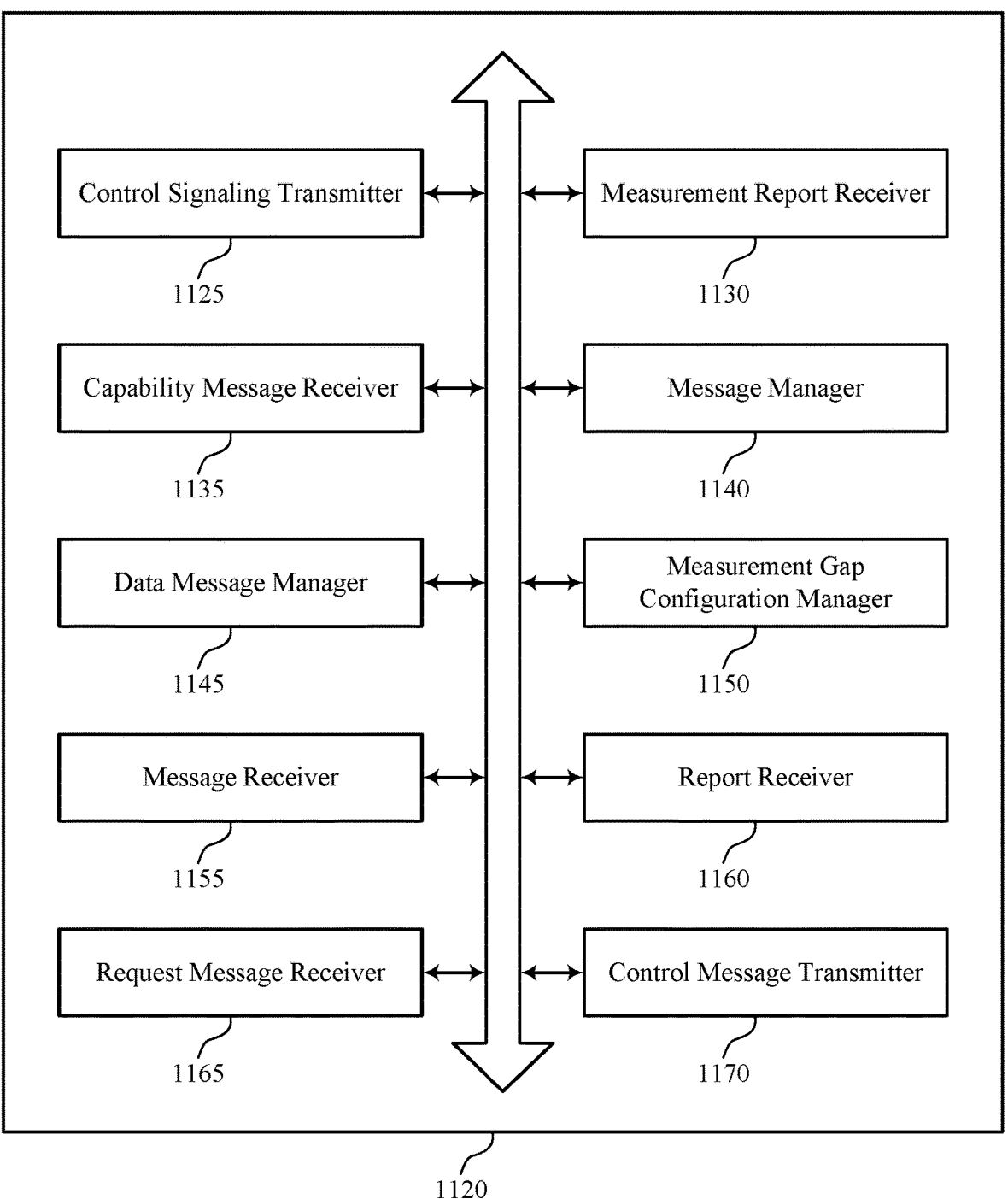
FIG. 11 shows a block diagram of a communications manager that supports techniques for enhanced measurement gaps using sensing procedures in accordance with one or more aspects of the present disclosure.

FIG. 11 shows a block diagram 1100 of a communications manager 1120 that supports techniques for enhanced measurement gaps using sensing procedures in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of techniques for enhanced measurement gaps using sensing procedures as described herein. For example, the communications manager 1120 may include a control signaling transmitter 1125, a measurement report receiver 1130, a capability message receiver 1135, a message manager 1140, a data message manager 1145, a measurement gap configuration manager 1150, a message receiver 1155, a report receiver 1160, a request message receiver 116065, a control message transmitter 116570, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications in accordance with examples as disclosed herein. The control signaling transmitter 1125 is capable of, configured to, or operable to support a means for transmitting, to a UE, control signaling instructing the UE to predict a signal quality measurement of a neighbor network entity using perception information sensed by the UE. The measurement report receiver 1130 is capable of, configured to, or operable to support a means for receiving, from the UE, a measurement report indicating a signal quality measurement prediction for the neighbor network entity based on the control signaling and the perception information sensed by the UE.

In some examples, the capability message receiver 1135 is capable of, configured to, or operable to support a means for receiving, from the UE, a capability message indicating a capability to predict signal quality measurements using the perception information sensed by the UE, where the control signaling is based on the capability message.

In some examples, the control signaling transmitter 1125 is capable of, configured to, or operable to support a means for transmitting, to the UE, an indication of a configuration of a set of measurement gaps for the UE to perform signal quality measurements of the neighbor network entity, where the control signaling instructs the UE to predict the signal quality measurement of the neighbor network entity using the perception information instead of performing a measurement of the neighbor network entity during a measurement gap of the set of measurement gaps.

In some examples, the measurement report receiver 1130 is capable of, configured to, or operable to support a means for receiving, from the UE, the measurement report indicating the signal quality measurement prediction based on an overlap of a first resource allocated for transmission of a data message and a second resource allocated for the measurement gap. In some examples, the data message manager 1145 is capable of, configured to, or operable to support a means for transmit, the data message via the first resource.

In some examples, the report receiver 1160 is capable of, configured to, or operable to support a means for receive, from the UE, a report indicating that the UE is going to skip performing a measurement during a measurement gap based on an overlap of a first resource allocated for reception of a data message and a second resource allocated for the measurement gap, where the control signaling instructing the UE to predict the signal quality measurement of the neighbor network entity using the perception information sensed by the UE is based on the report. In some examples, the data message manager 1145 is capable of, configured to, or operable to support a means for receive the data message via the first resource.

In some examples, the message manager 1140 is capable of, configured to, or operable to support a means for receiving, from the UE, a message indicating that the UE is going to skip performing a measurement during a measurement gap, where the control signaling instructing the UE to predict the signal quality measurement of the neighbor network entity using the perception information sensed by the UE is based on the message. In some examples, the data message manager 1145 is capable of, configured to, or operable to support a means for transmitting a message using resources of the measurement gap.

In some examples, the measurement gap configuration manager 1150 is capable of, configured to, or operable to support a means for transmitting, to the UE, an indication of a configuration of a set of measurement gaps for performing signal quality measurements of the neighbor network entity.

In some examples, the request message receiver 1165 is capable of, configured to, or operable to support a means for receiving, from the UE, a request message to change a periodicity of the measurement gaps within the set of measurement gaps. In some examples, the measurement gap configuration manager 1150 is capable of, configured to, or operable to support a means for transmitting, to the UE, an updated configuration of the set of measurement gaps, the updated configuration being in accordance with the change in the periodicity indicated via the request message.

In some examples, the control message transmitter 1170 is capable of, configured to, or operable to support a means for transmitting, to the UE, a control message indicating a signal quality threshold, where the request message to change the periodicity of the measurement gaps within the set of measurement gaps is based on a signal quality measurement of the neighbor network entity satisfying the signal quality threshold.

In some examples, to support transmitting the request message, the control message transmitter 1170 is capable of, configured to, or operable to support a means for transmitting, to the UE, a control message indicating a signal quality threshold, where the request message to change the periodicity of the measurement gaps within the set of measurement gaps is based on the signal quality measurement prediction for the neighbor network entity failing to satisfy the signal quality threshold.

In some examples, the message receiver 1155 is capable of, configured to, or operable to support a means for receiving, from the UE, a message indicating that the UE has generated spatial map of an environment, where transmitting the control signaling is based on the message.

Figure 12:
FIG. 12 shows a diagram of a system including a device that supports techniques for enhanced measurement gaps using sensing procedures in accordance with one or more aspects of the present disclosure.

FIG. 12 shows a diagram of a system 1200 including a device 1205 that supports techniques for enhanced measurement gaps using sensing procedures in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., a communication link 125, a backhaul communication link 120, a midhaul communication link 162, a fronthaul communication link 168).

The at least one memory 1225 may include RAM, ROM, or any combination thereof. The at least one memory 1225 may store computer-readable, computer-executable code 1230 including instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may contain, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting techniques for enhanced measurement gaps using sensing procedures). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225). In some examples, the at least one processor 1235 may include multiple processors and the at least one memory 1225 may include multiple memories. One or more of the multiple processors may be coupled with one or more of the multiple memories, which may, individually or collectively, be configured to perform various functions herein. In some examples, the at least one processor 1235 may be a component of a processing system, which may refer to a system (such as a series) of machines, circuitry (including, for example, one or both of processor circuitry (which may include the at least one processor 1235) and memory circuitry (which may include the at least one memory 1225)), or components, that receives or obtains inputs and processes the inputs to produce, generate, or obtain a set of outputs. The processing system may be configured to perform one or more of the functions described herein. As such, the at least one processor 1235 or a processing system including the at least one processor 1235 may be configured to, configurable to, or operable to cause the device 1205 to perform one or more of the functions described herein. Further, as described herein, being "configured to," being "configurable to," and being "operable to" may be used interchangeably and may be associated with a capability, when executing code stored in the at least one memory 1225 or otherwise, to perform one or more of the functions described herein.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications in accordance with examples as disclosed herein. For example, the communications manager 1220 is capable of, configured to, or operable to support a means for transmitting, to a UE, control signaling instructing the UE to predict a signal quality measurement of a neighbor network entity using perception information sensed by the UE. The communications manager 1220 is capable of, configured to, or operable to support a means for receiving, from the UE, a measurement report indicating a signal quality measurement prediction for the neighbor network entity based on the control signaling and the perception information sensed by the UE.

By including or configuring the communications manager 1220 in accordance with examples as described herein, the device 1205 may support techniques for a UE 115 to use perception information to predict a signal quality measurement of a neighbor network entity 105 for improved communication reliability, reduced latency, improved user experience related to reduced processing, reduced power consumption, more efficient utilization of communication resources, improved coordination between devices, and an improved utilization of processing capability.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of techniques for enhanced measurement gaps using sensing procedures as described herein, or the at least one processor 1235 and the at least one memory 1225 may be otherwise configured to, individually or collectively, perform or support such operations.

FIG. 13 shows a flowchart illustrating a method 1300 that supports techniques for enhanced measurement gaps using sensing procedures in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving, from a serving network entity, control signaling instructing the UE to predict a signal quality measurement of a neighbor network entity using perception information sensed by the UE. The operations of block 1305 may be performed in accordance with examples as disclosed herein. In some examples, aspects of the operations of 1305 may be performed by a control signaling receiver 725 as described with reference to FIG. 7.

At 1310, the method may include transmitting, to the serving network entity, a measurement report indicating a signal quality measurement prediction for the neighbor network entity based on the control signaling and the perception information sensed by the UE. The operations of block 1310 may be performed in accordance with examples as disclosed herein. In some examples, aspects of the operations of 1310 may be performed by a measurement report transmitter 730 as described with reference to FIG. 7.

FIG. 14 shows a flowchart illustrating a method 1400 that supports techniques for enhanced measurement gaps using sensing procedures in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include transmitting, to the serving network entity, a capability message indicating a capability to predict signal quality measurements using the perception information sensed by the UE. The operations of block 1405 may be performed in accordance with examples as disclosed herein. In some examples, aspects of the operations of 1405 may be performed by a capability message transmitter 735 as described with reference to FIG. 7.

At 1410, the method may include receiving, from a serving network entity, control signaling instructing the UE to predict a signal quality measurement of a neighbor network entity using perception information sensed by the UE, where the control signaling is based on the capability message. The operations of block 1410 may be performed in accordance with examples as disclosed herein. In some examples, aspects of the operations of 1410 may be performed by a control signaling receiver 725 as described with reference to FIG. 7.

At 1415, the method may include transmitting, to the serving network entity, a measurement report indicating a signal quality measurement prediction for the neighbor network entity based on the control signaling and the perception information sensed by the UE. The operations of block 1415 may be performed in accordance with examples as disclosed herein. In some examples, aspects of the operations of 1415 may be performed by a measurement report transmitter 730 as described with reference to FIG. 7.

FIG. 15 shows a flowchart illustrating a method 1500 that supports techniques for enhanced measurement gaps using sensing procedures in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include receiving, from the serving network entity, an indication of a configuration of a set of measurement gaps for performing signal quality measurements of the neighbor network entity. The operations of block 1505 may be performed in accordance with examples as disclosed herein. In some examples, aspects of the operations of 1505 may be performed by a measurement gap configuration component 750 as described with reference to FIG. 7.

At 1510, the method may include receiving, from a serving network entity, control signaling instructing the UE to predict a signal quality measurement of a neighbor network entity using perception information sensed by the UE. The operations of block 1510 may be performed in accordance with examples as disclosed herein. In some examples, aspects of the operations of 1510 may be performed by a control signaling receiver 725 as described with reference to FIG. 7.

At 1515, the method may include transmitting, to the serving network entity, a measurement report indicating a signal quality measurement prediction for the neighbor network entity based on the control signaling and the perception information sensed by the UE. The operations of block 1515 may be performed in accordance with examples as disclosed herein. In some examples, aspects of the operations of 1515 may be performed by a measurement report transmitter 730 as described with reference to FIG. 7.

FIG. 16 shows a flowchart illustrating a method 1600 that supports techniques for enhanced measurement gaps using sensing procedures in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1605, the method may include receiving, from the serving network entity, an indication of a configuration of a set of measurement gaps for performing signal quality measurements of the neighbor network entity. The operations of block 1605 may be performed in accordance with examples as disclosed herein. In some examples, aspects of the operations of 1605 may be performed by a measurement gap configuration component 750 as described with reference to FIG. 7.

At 1610, the method may include receiving, from a serving network entity, control signaling instructing the UE to predict a signal quality measurement of a neighbor network entity using perception information sensed by the UE. The operations of block 1610 may be performed in accordance with examples as disclosed herein. In some examples, aspects of the operations of 1610 may be performed by a control signaling receiver 725 as described with reference to FIG. 7.

At 1615, the method may include transmitting, to the serving network entity, a request message to change a periodicity of the measurement gaps within the set of measurement gaps. The operations of block 1615 may be performed in accordance with examples as disclosed herein. In some examples, aspects of the operations of 1615 may be performed by a request message transmitter 760 as described with reference to FIG. 7.

At 1620, the method may include receiving, from the serving network entity, an updated configuration of the set of measurement gaps, the updated configuration being in accordance with the change in the periodicity indicated via the request message. The operations of block 1620 may be performed in accordance with examples as disclosed herein. In some examples, aspects of the operations of 1620 may be performed by a measurement gap configuration component 750 as described with reference to FIG. 7.

At 1625, the method may include transmitting, to the serving network entity, a measurement report indicating a signal quality measurement prediction for the neighbor network entity based on the control signaling and the perception information sensed by the UE. The operations of block 1625 may be performed in accordance with examples as disclosed herein. In some examples, aspects of the operations of 1625 may be performed by a measurement report transmitter 730 as described with reference to FIG. 7.

FIG. 17 shows a flowchart illustrating a method 1700 that supports techniques for enhanced measurement gaps using sensing procedures in accordance with aspects of the present disclosure. The operations of the method 1700 may be implemented by a network entity or its components as described herein. For example, the operations of the method 1700 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1705, the method may include transmitting, to a UE, control signaling instructing the UE to predict a signal quality measurement of a neighbor network entity using perception information sensed by the UE. The operations of block 1705 may be performed in accordance with examples as disclosed herein. In some examples, aspects of the operations of 1705 may be performed by a control signaling transmitter 1125 as described with reference to FIG. 11.

At 1710, the method may include receiving, from the UE, a measurement report indicating a signal quality measurement prediction for the neighbor network entity based on the control signaling and the perception information sensed by the UE. The operations of block 1710 may be performed in accordance with examples as disclosed herein. In some examples, aspects of the operations of 1710 may be performed by a measurement report receiver 1130 as described with reference to FIG. 11.

The following provides an overview of aspects of the present disclosure:

Aspect 1: A method for wireless communications by a UE, comprising: receiving, from a serving network entity, control signaling instructing the UE to predict a signal quality measurement of a neighbor network entity using perception information sensed by the UE; and transmitting, to the serving network entity, a measurement report indicating a signal quality measurement prediction for the neighbor network entity based at least in part on the control signaling and the perception information sensed by the UE.

Aspect 2: The method of aspect 1, further comprising: transmitting, to the serving network entity, a capability message indicating a capability to predict signal quality measurements using the perception information sensed by the UE, wherein the control signaling is based at least in part on the capability message.

Aspect 3: The method of any of aspects 1 through 2, further comprising: receiving, from the serving network entity, an indication of a configuration of a set of measurement gaps for performing signal quality measurements of the neighbor network entity, wherein the control signaling instructs the UE to predict the signal quality measurement of the neighbor network entity using the perception information to instead of performing a measurement of the neighbor network entity during a measurement gap of the set of measurement gaps.

Aspect 4: The method of aspect 3, further comprising: transmitting, to the serving network entity, the measurement report indicating the signal quality measurement prediction based at least in part on an overlap of a first resource allocated for transmission of a data message and a second resource allocated for the measurement gap; and transmitting the data message via the first resource.

Aspect 5: The method of any of aspects 3 through 4, further comprising: transmitting, to the serving network entity, a report indicating that the UE is skipping performing a measurement during a measurement gap based at least in part on an overlap of a first resource allocated for reception of a data message and a second resource allocated for the measurement gap, wherein the control signaling instructing the UE to predict the signal quality measurement of the neighbor network entity using the perception information sensed by the UE is based at least in part on the report; and receiving the data message via the first resource.

Aspect 6: The method of any of aspects 1 through 5, further comprising: receiving, from the serving network entity, an indication of a configuration of a set of measurement gaps for performing signal quality measurements of the neighbor network entity.

Aspect 7: The method of aspect 6, further comprising: transmitting, to the serving network entity, a request message to change a periodicity of the measurement gaps within the set of measurement gaps; and receiving, from the serving network entity, an updated configuration of the set of measurement gaps, the updated configuration being in accordance with the change in the periodicity indicated via the request message.

Aspect 8: The method of aspect 7, further comprising: receiving, from the serving network entity, a control message indicating a signal quality threshold, wherein the request message to change the periodicity of the measurement gaps within the set of measurement gaps is based at least in part on a signal quality measurement of the neighbor network entity satisfying the signal quality threshold.

Aspect 9: The method of any of aspects 7 through 8, wherein transmitting the request message further comprises: receiving, from the serving network entity, a control message indicating a signal quality threshold, wherein the request message to change the periodicity of the measurement gaps within the set of measurement gaps is based at least in part on the signal quality measurement prediction for the neighbor network entity failing to satisfy the signal quality threshold.

Aspect 10: The method of any of aspects 6 through 9, wherein the UE to refrains from performing a measurement during at least one measurement gap of the set of measurement gaps based at least in part on the control signaling Aspect 11: The method of any of aspects 1 through 10, wherein the signal quality measurement prediction is based at least in part on a spatial map of an environment.

Aspect 12: The method of aspect 11, further comprising: generating the spatial map of the environment by performing signal quality measurements during a set of signal quality measurements: transmitting, to the serving network entity, a message indicating that the spatial map of the environment is generated, wherein receiving the control signaling is based at least in part on the message.

Aspect 13: The method of any of aspects 11 through 12, wherein the spatial map of the environment is generated using a ML model.

Aspect 14: A method for wireless communications by a network entity, comprising: transmitting, to a UE, control signaling instructing the UE to predict a signal quality measurement of a neighbor network entity using perception information sensed by the UE; and receiving, from the UE, a measurement report indicating a signal quality measurement prediction for the neighbor network entity based at least in part on the control signaling and the perception information sensed by the UE.

Aspect 15: The method of aspect 14, further comprising: receiving, from the UE, a capability message indicating a capability to predict signal quality measurements using the perception information sensed by the UE, wherein the control signaling is based at least in part on the capability message.

Aspect 16: The method of any of aspects 14 through 15, further comprising: transmitting, to the UE, an indication of a configuration of a set of measurement gaps for the UE to perform signal quality measurements of the neighbor network entity, wherein the control signaling instructs the UE to predict the signal quality measurement of the neighbor network entity using the perception information instead of performing a measurement of the neighbor network entity during a measurement gap of the set of measurement gaps.

Aspect 17: The method of aspect 16, further comprising: receiving, from the UE, the measurement report indicating the signal quality measurement prediction based at least in part on an overlap of a first resource allocated for transmission of a data message and a second resource allocated for the measurement gap; and transmit, the data message via the first resource.

Aspect 18: The method of any of aspects 16 through 17, further comprising: receive, from the UE, a report indicating that the UE is going to skip performing a measurement during a measurement gap based at least in part on an overlap of a first resource allocated for reception of a data message and a second resource allocated for the measurement gap, wherein the control signaling instructing the UE to predict the signal quality measurement of the neighbor network entity using the perception information sensed by the UE is based at least in part on the report; and receive the data message via the first resource.

Aspect 19: The method of any of aspects 14 through 18, further comprising: receiving, from the UE, a message indicating that the UE is going to skip performing a measurement during a measurement gap, wherein the control signaling instructing the UE to predict the signal quality measurement of the neighbor network entity using the perception information sensed by the UE is based at least in part on the message; and transmitting a message using resources of the measurement gap.

Aspect 20: The method of any of aspects 14 through 19, further comprising: transmitting, to the UE, an indication of a configuration of a set of measurement gaps for performing signal quality measurements of the neighbor network entity.

Aspect 21: The method of aspect 20, further comprising: receiving, from the UE, a request message to change a periodicity of the measurement gaps within the set of measurement gaps; and transmitting, to the UE, an updated configuration of the set of measurement gaps, the updated configuration being in accordance with the change in the periodicity indicated via the request message.

Aspect 22: The method of aspect 21, further comprising: transmitting, to the UE, a control message indicating a signal quality threshold, wherein the request message to change the periodicity of the measurement gaps within the set of measurement gaps is based at least in part on a signal quality measurement of the neighbor network entity satisfying the signal quality threshold.

Aspect 23: The method of any of aspects 21 through 22, wherein transmitting the request message further comprises: transmitting, to the UE, a control message indicating a signal quality threshold, wherein the request message to change the periodicity of the measurement gaps within the set of measurement gaps is based at least in part on the signal quality measurement prediction for the neighbor network entity failing to satisfy the signal quality threshold.

Aspect 24: The method of any of aspects 14 through 23, further comprising: receiving, from the UE, a message indicating that the UE has generated spatial map of an environment, wherein transmitting the control signaling is based at least in part on the message.

Aspect 25: A UE for wireless communications, comprising one or more memories storing processor-executable code, and one or more processors coupled with the one or more memories and individually or collectively operable to execute the code to cause the UE to perform a method of any of aspects 1 through 13.

Aspect 26: A UE for wireless communications, comprising at least one means for performing a method of any of aspects 1 through 13.

Aspect 27: A non-transitory computer-readable medium storing code for wireless communications, the code comprising instructions executable by a processor to perform a method of any of aspects 1 through 13.

Aspect 28: A network entity for wireless communications, comprising one or more memories storing processor-executable code, and one or more processors coupled with the one or more memories and individually or collectively operable to execute the code to cause the network entity to perform a method of any of aspects 14 through 24.

Aspect 29: A network entity for wireless communications, comprising at least one means for performing a method of any of aspects 14 through 24.

Aspect 30: A non-transitory computer-readable medium storing code for wireless communications, the code comprising instructions executable by a processor to perform a method of any of aspects 14 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
    one or more memories storing processor-executable code; and
    one or more processors coupled with the one or more memories and individually or collectively operable to execute the code to cause the UE to:
        receive, from a serving network entity, an indication of a configuration of a set of measurement gaps for performing signal quality measurements of a neighbor network entity:
        receive, from the serving network entity, control signaling instructing the UE to predict a signal quality measurement of the neighbor network entity using perception information sensed by the UE instead of performing a measurement of the neighbor network entity during a measurement gap of the set of measurement gaps;
        transmit, to the serving network entity, a measurement report indicating a signal quality measurement prediction for the neighbor network entity based at least in part on the control signaling, the perception information sensed by the UE, and an overlap of a first resource allocated for transmission of a data message and a second resource allocated for the measurement gap; and
        transmit the data message via the first resource.

2. The UE of claim 1, wherein the one or more processors are individually or collectively further operable to execute the code to cause the UE to:

transmit, to the serving network entity, a capability message indicating a capability to predict signal quality measurements using the perception information sensed by the UE, wherein the control signaling is based at least in part on the capability message.

3. The UE of claim 1, wherein the one or more processors are individually or collectively further operable to execute the code to cause the UE to:

transmit, to the serving network entity, a request message to change a periodicity of the measurement gaps within the set of measurement gaps; and receive, from the serving network entity, an updated configuration of the set of measurement gaps, the updated configuration being in accordance with the change in the periodicity indicated via the request message.

4. The UE of claim 3, wherein the one or more processors are individually or collectively further operable to execute the code to cause the UE to:

receive, from the serving network entity, a control message indicating a signal quality threshold, wherein the request message to change the periodicity of the measurement gaps within the set of measurement gaps is based at least in part on a signal quality measurement of the neighbor network entity satisfying the signal quality threshold.

5. The UE of claim 3, wherein, to transmit the request message, the one or more processors are individually or collectively further operable to execute the code to cause the UE to:

receive, from the serving network entity, a control message indicating a signal quality threshold, wherein the request message to change the periodicity of the measurement gaps within the set of measurement gaps is based at least in part on the signal quality measurement prediction for the neighbor network entity failing to satisfy the signal quality threshold.

6. The UE of claim 1, wherein the one or more processors are individually or collectively further operable to execute the code to cause the UE to refrain from performing a measurement during at least one measurement gap of the set of measurement gaps based at least in part on the control signaling.

7. The UE of claim 1, wherein the signal quality measurement prediction is based at least in part on a spatial map of an environment.

8. The UE of claim 7, wherein the one or more processors are individually or collectively further operable to execute the code to cause the UE to:

generate the spatial map of the environment by performing signal quality measurements during a set of signal quality measurements:

transmit, to the serving network entity, a message indicating that the spatial map of the environment is generated, wherein receiving the control signaling is based at least in part on the message.

9. The UE of claim 7, wherein the spatial map of the environment is generated using a machine learning model.

10. A network entity, comprising:

one or more memories storing processor-executable code; and one or more processors coupled with the one or more memories and individually or collectively operable to execute the code to cause the network entity to:

transmit, to a user equipment (UE), an indication of a configuration of a set of measurement gaps for performing signal quality measurements of a neighbor network entity;

receive, from the UE, a request message to change a periodicity of the measurement gaps within the set of measurement gaps;

transmit, to the UE, an updated configuration of the set of measurement gaps, the updated configuration being in accordance with the change in the periodicity indicated via the request message;

transmit, to the UE, control signaling instructing the UE to predict a signal quality measurement of the neighbor network entity using perception information sensed by the UE; and receive, from the UE, a measurement report indicating a signal quality measurement prediction for the neighbor network entity based at least in part on the control signaling and the perception information sensed by the UE.

11. The network entity of claim 10, wherein the one or more processors are individually or collectively further operable to execute the code to cause the network entity to:

receive, from the UE, a capability message indicating a capability to predict signal quality measurements using the perception information sensed by the UE, wherein the control signaling is based at least in part on the capability message.

12. The network entity of claim 10, wherein the control signaling instructs the UE to predict the signal quality measurement of the neighbor network entity using the perception information instead of performing a measurement of the neighbor network entity during a measurement gap of the set of measurement gaps.

13. The network entity of claim 12, wherein the one or more processors are individually or collectively further operable to execute the code to cause the UE to:

receive, from the UE, the measurement report indicating the signal quality measurement prediction based at least in part on an overlap of a first resource allocated for transmission of a data message and a second resource allocated for the measurement gap; and transmit, the data message via the first resource.

14. The network entity of claim 12, wherein the one or more processors are individually or collectively further operable to execute the code to cause the network entity to:

receive, from the UE, a report indicating that the UE is going to skip performing a measurement during a measurement gap based at least in part on an overlap of a first resource allocated for reception of a data message and a second resource allocated for the measurement gap, wherein the control signaling instructing the UE to predict the signal quality measurement of the neighbor network entity using the perception information sensed by the UE is based at least in part on the report; and receive the data message via the first resource.

15. The network entity of claim 10, wherein the one or more processors are individually or collectively further operable to execute the code to cause the network entity to:

transmit, to the UE, a control message indicating a signal quality threshold, wherein the request message to change the periodicity of the measurement gaps within the set of measurement gaps is based at least in part on a signal quality measurement of the neighbor network entity satisfying the signal quality threshold.

16. The network entity of claim 10, wherein, to transmit the request message, the one or more processors are individually or collectively further operable to execute the code to cause the network entity to:

transmit, to the UE, a control message indicating a signal quality threshold, wherein the request message to change the periodicity of the measurement gaps within the set of measurement gaps is based at least in part on the signal quality measurement prediction for the neighbor network entity failing to satisfy the signal quality threshold.

17. The network entity of claim 10, wherein the one or more processors are individually or collectively further operable to execute the code to cause the network entity to:

receive, from the UE, a message indicating that the UE has generated spatial map of an environment, wherein transmitting the control signaling is based at least in part on the message.

18. A method for wireless communications by a user equipment (UE), comprising:

receiving, from a serving network entity, an indication of a configuration of a set of measurement gaps for performing signal quality measurements of a neighbor network entity;

transmitting, to the serving network entity, a request message to change a periodicity of the measurement gaps within the set of measurement gaps;

receiving, from the serving network entity, an updated configuration of the set of measurement gaps, the updated configuration being in accordance with the change in the periodicity indicated via the request message;

receiving, from the serving network entity, control signaling instructing the UE to predict a signal quality measurement of the neighbor network entity using perception information sensed by the UE; and transmitting, to the serving network entity, a measurement report indicating a signal quality measurement prediction for the neighbor network entity based at least in part on the control signaling and the perception information sensed by the UE.

19. The method of claim 18, further comprising:

transmitting, to the serving network entity, a capability message indicating a capability to predict signal quality measurements using the perception information sensed by the UE, wherein the control signaling is based at least in part on the capability message.

20. The method of claim 18, wherein the control signaling instructs the UE to predict the signal quality measurement of the neighbor network entity using the perception information instead of performing a measurement of the neighbor network entity during a measurement gap of the set of measurement gaps.

21. The method of claim 18, wherein the signal quality measurement prediction is based at least in part on a spatial map of an environment.

22. A method for wireless communications by a network entity, comprising:

transmitting, to a user equipment (UE), an indication of a configuration of a set of measurement gaps for the UE to perform signal quality measurements of a neighbor network entity, transmitting, to the UE, control signaling instructing the UE to predict a signal quality measurement of the neighbor network entity using perception information sensed by the UE instead of performing a measurement of the neighbor network entity during a measurement gap of the set of measurement gaps; and receiving, from the UE, a measurement report indicating a signal quality measurement prediction for the neighbor network entity based at least in part on the control signaling, the perception information sensed by the UE, and an overlap of a first resource allocated for transmission of a data message and a second resource allocated for the measurement gap; and transmitting, the data message via the first resource.

23. The method of claim 22, further comprising:

receiving, from the UE, a capability message indicating a capability to predict signal quality measurements using the perception information sensed by the UE, wherein the control signaling is based at least in part on the capability message.

24. The method of claim 22, further comprising:

receiving, from the UE, a message indicating that the UE has generated spatial map of an environment, wherein transmitting the control signaling is based at least in part on the message.

* * * * *